US012110669B2

(12) United States Patent
Chung

(10) Patent No.: US 12,110,669 B2
(45) Date of Patent: Oct. 8, 2024

(54) SHOWER WITH ELECTRONICALLY-ACTUATED MODE CHANGING

(71) Applicant: Kohler Co., Kohler, WI (US)

(72) Inventor: Chanseol Chung, Milwaukee, WI (US)

(73) Assignee: KOHLER CO., Kohler, WI (US)

( * ) Notice: Subject to any disclaimer, the term of this patent is extended or adjusted under 35 U.S.C. 154(b) by 480 days.

(21) Appl. No.: 17/241,764

(22) Filed: Apr. 27, 2021

(65) Prior Publication Data

US 2021/0332573 A1 Oct. 28, 2021

Related U.S. Application Data

(60) Provisional application No. 63/016,685, filed on Apr. 28, 2020.

(51) Int. Cl.

| | |
|---|---|
| ***E03C 1/04*** | (2006.01) |
| ***B05B 1/12*** | (2006.01) |
| ***E03C 1/05*** | (2006.01) |
| *G10L 25/03* | (2013.01) |
| *G10L 25/27* | (2013.01) |

(52) U.S. Cl.

CPC ................ *E03C 1/057* (2013.01); *B05B 1/12* (2013.01); *E03C 1/0408* (2013.01); *G10L 25/03* (2013.01); *G10L 25/27* (2013.01)

(58) Field of Classification Search

CPC .... E03C 1/057; E03C 1/0408; E03C 2201/30; E03C 1/0405; B05B 1/12; B05B 1/16; B05B 1/185; B05B 12/00; G10L 25/03; G10L 25/27; G10L 25/48

See application file for complete search history.

(56) References Cited

U.S. PATENT DOCUMENTS

2008/0156902 A1* 7/2008 Luettgen ............... B05B 1/1663 239/447
2012/0261496 A1* 10/2012 Lev ....................... B05B 1/1636 239/443

(Continued)

FOREIGN PATENT DOCUMENTS

CN 210249641 U 4/2020

OTHER PUBLICATIONS

International Search Report and Written Opinion on PCT Appl. Ser. No. PCT/US2021/029383 dated Aug. 31, 2021 (10 pages).

*Primary Examiner* — Qingzhang Zhou
*Assistant Examiner* — Joel Zhou
(74) *Attorney, Agent, or Firm* — FOLEY & LARDNER LLP

(57) ABSTRACT

A shower system for controlling a spray pattern of water includes a sprayer and a control device. The sprayer includes a housing and an electronic diverter. The housing includes a water inlet and a plurality of water outlets configured to discharge water from the housing to form a plurality of different spray patterns. The electronic diverter is located within the housing and configured to automatically divert the water to different sets of the plurality of water outlets to form the plurality of different spray patterns responsive to an instruction signal. The control device is separate from the sprayer and is configured to provide the instruction signal to the electronic diverter to cause the electronic diverter to change between the plurality of different spray patterns.

20 Claims, 11 Drawing Sheets

(56) References Cited

U.S. PATENT DOCUMENTS

| | | | |
|---|---|---|---|
| 2017/0087563 A1 | 3/2017 | Lin | |
| 2017/0089317 A1 | 3/2017 | Lin et al. | |
| 2018/0193852 A1 | 7/2018 | L'Henaff et al. | |
| 2019/0051276 A1 | 2/2019 | Lathrop et al. | |
| 2019/0089550 A1* | 3/2019 | Rexach | E03C 1/057 |

* cited by examiner

SHOWER WITH ELECTRONICALLY-ACTUATED MODE CHANGING

CROSS-REFERENCE TO RELATED PATENT APPLICATION

This application claims the benefit of and priority to U.S. Provisional Patent Application No. 63/016,685, filed Apr. 28, 2020, the entire disclosure of which is incorporated by reference herein.

BACKGROUND

The present disclosure relates generally to shower systems. More specifically, the present disclosure relates to a shower system including a sprayer having an electronic diverter and associated accessories, and a control system that allows for synchronization of music with the discharge of water from the sprayer and other water delivery devices in a shower environment.

SUMMARY

One embodiment of the present disclosure relates to a shower system for controlling a spray pattern of water. The shower system includes a sprayer and a control device. The sprayer includes a housing and an electronic diverter. The housing includes a water inlet and a plurality of water outlets configured to discharge water from the housing to form a plurality of different spray patterns. The electronic diverter is located within the housing and configured to automatically divert the water to different sets of the plurality of water outlets to form the plurality of different spray patterns responsive to an instruction signal. The control device is separate from the sprayer and is configured to provide the instruction signal to the electronic diverter to cause the electronic diverter to change between the plurality of different spray patterns.

In some embodiments, the electronic diverter may include a pattern wheel configured to rotate between a plurality of different positions to form the plurality of different spray patterns. In some embodiments, the plurality of different positions may include a first position in which the pattern wheel causes the water discharged from the housing to form a first spray pattern of the plurality of different spray patterns, a second position in which the pattern wheel causes the water discharged from the housing to form a second spray pattern of the plurality of different spray patterns and a third position in which the pattern wheel causes the water discharged from the housing to form a third spray pattern of the plurality of different spray patterns.

In some embodiments, the second position may be located between the first position and the third position such that rotation of the pattern wheel from the first position to the third position can cause the pattern wheel to rotate sequentially from the first position to the second position and then from the second position to the third position. During rotation from the first position to the third position, the electronic diverter may be configured to cause the pattern wheel to remain in the second position for less than an amount of time required for the second spray pattern to form such that the water discharged from the housing can change from the first spray pattern to the third spray pattern without form the second spray pattern.

In some embodiments, the electronic diverter may include an actuator configured to rotate the pattern wheel from a first position of the plurality of different positions to a second position of the plurality of different positions within a rotation interval less than an amount of time required for the water discharged from the housing to form a spray pattern of the plurality of different spray patterns. In some embodiments, the amount of time required for the water discharged from the housing to form the spray pattern may be between approximately 0.5 second and approximately 0.7 seconds.

In some embodiments, the sprayer may include a power supply contained within the housing. The sprayer may be configured to supply power to the electronic diverter. The power supply is configured to charge using kinetic energy derived from a flow of water through the sprayer.

In some embodiments, the control device may include a user interface. The user interface is configured to generate the instruction signal to cause the electronic diverter to change between the plurality of different spray patterns based on user input provided via the user interface.

In some embodiments, the control device may be configured to extract audio characteristics from a sound file. The control device may be configured to generate the instruction signal to cause the electronic diverter to change between the plurality of different spray patterns based on the audio characteristics of the sound file. In some embodiments, the control device is configured to split the sound file into a plurality of segments. The control device may calculate an audio frequency of each segment of the sound file. The control device may generate a sequence of spray patterns by matching the audio frequency of each segment of the sound file to a corresponding spray pattern of the plurality of different spray patterns. The control device may generate the instruction signal to cause the electronic diverter to provide the sequence of spray patterns. In some embodiments, the control device calculates the audio frequency. Calculating the audio frequency of each segment of the sound file includes performing a Fast Fourier Transform (FFT) of each segment.

In some embodiments, the control device may be configured to split the sound file into a segment having a time interval. The control device may calculate the Fast Fourier Transform (FFT) of the segment. Using the FFT, the control device may determine a first peak and a second peak. The first peak can correspond to a first frequency and a first amplitude. The second peak can correspond to a second frequency and a second amplitude. The control device may use the first peak and the second peak to calculate a weighted average. The control device may use the calculated weighted average to match the weighted average to a corresponding spray pattern of the plurality of different spray patterns. The control device may generate the instruction signal to cause the electronic diverter to provide the corresponding spray pattern.

Another embodiment of the present disclosure related to a sprayer for use in a shower environment. The sprayer includes a housing and an electronic diverter. The housing includes a water inlet and a plurality of water outlets configured to discharge water from the housing to form a plurality of different spray patterns. The electronic diverter is located within the housing and configured to transition the water discharged from the housing between the plurality of different spray patterns responsive to an instruction signal. The electronic diverter includes a pattern wheel and an actuator. The pattern wheel is configured to rotate between a plurality of different positions to form the plurality of different spray patterns. The actuator is configured to operate the pattern wheel to rotate between the plurality of different positions.

In some embodiments, the plurality of different positions can include a first position in which the pattern wheel causes the water discharged from the housing to form a first spray pattern of the plurality of different spray patterns, a second position in which the pattern wheel causes the water discharged from the housing to form a second spray pattern of the plurality of different spray patterns, and a third position in which the pattern wheel causes the water discharged from the housing to form a third spray pattern of the plurality of different spray patterns In some embodiments, the second position may be located between the first position and the third position such that rotation of the pattern wheel from the first position to the third position can cause the pattern wheel to rotate sequentially from the first position to the second position and then from the second position to the third position. During rotation from the first position to the third position, the actuator may be configured to cause the pattern wheel to remain in the second position for less than an amount of time required for the second spray pattern to form such that the water discharged from the housing changes from the first spray pattern to the third spray pattern without forming the second spray pattern.

In some embodiments, the actuator may be configured to rotate the pattern wheel from a first position of the plurality of different positions to a second position of the plurality of different positions within a rotation interval less than an amount of time required for the water discharged from the housing to form a spray pattern of the plurality of different spray patterns. In some embodiments, the amount of time required for the water discharged from the housing to form a spray pattern may be between approximately 0.5 seconds and approximately 0.7 seconds.

In some embodiments, the sprayer can further include a power supply contained within the housing. The power supply may be configured to supply power to the electronic diverter. The power supply may be configured to charge using kinetic energy derived from a flow of water through the sprayer.

Another embodiment of the present disclosure relates to a method of controlling a sprayer in a shower system. The method including generating, at a control device separate from the sprayer, an instruction signal for the sprayer to change between a plurality of different spray patterns. The method further includes providing the instruction signal from the control device to an electronic diverter located within a housing of the sprayer, the housing including a water inlet and a plurality of water outlets. The method further includes operating the electronic diverter responsive to the instruction signal to automatically divert water to different sets of the plurality of water outlets to form the plurality of different spray patterns.

In some embodiments, operating the electronic diverter responsive to the instruction signal may include operating a pattern wheel of the electronic diverter to rotate between a plurality of different positions to form the plurality of different spray patterns.

Those skilled in the art will appreciate that the summary is illustrative only and should not be regarded as limiting. Other aspects, inventive features, and advantages of the systems, devices, and/or processes described herein, as defined solely by the claims, will become apparent in the detailed description set forth herein and taken in conjunction with the accompanying drawings.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, a shower system may include a sprayer fluidly coupled to a water conduit extending into a shower environment. For example, the sprayer may be coupled to a shower column at a fixed location. The shower column may include an overhead sprayer (e.g., rainhead, rainhead sprayer, etc.) or a handheld sprayer. The shower column may include both an overhead sprayer and a handheld sprayer positioned at different fixed or movable locations within a shower environment. The handheld sprayer typically includes an extended length of hose or flexible conduit that can allow for a user to remove the sprayer from a docked location in the shower environment and selectively position the sprayer closer to the user's body to, for example, perform a rinsing task.

Conventional sprayers (e.g., overhead, handheld, rainhead, etc.) may include an assembly of internal moving mechanical parts behind the spray face to provide different spray patterns/modes, such as impellers or other moving parts. A user may adjust the sprayer by hand, turning a knob of the sprayer, or rotating a face of the sprayer to change a spray pattern of the sprayer. In some embodiments, where the sprayer is in a fixed position above a user's head, it may be difficult for the user to actuate the moving components within the sprayer. For example, the user may be too short to reach, or the user may not have the appropriate leverage to actuate the sprayer.

Additionally, some conventional shower systems include a plurality of water delivery devices and an entertainment system (e.g., audio system, lighting system, etc.) coupled in a shower environment to provide a user experience. The discharge of water from the water delivery devices in these systems, however, is typically separately controlled and independent from any audio or visual entertainment provided by the entertainment system.

It would be advantageous to provide a shower system including a sprayer and an entertainment system that can overcome the above-noted limitations associated with conventional shower systems, so as to provide for an improved user experience.

Figure 1:
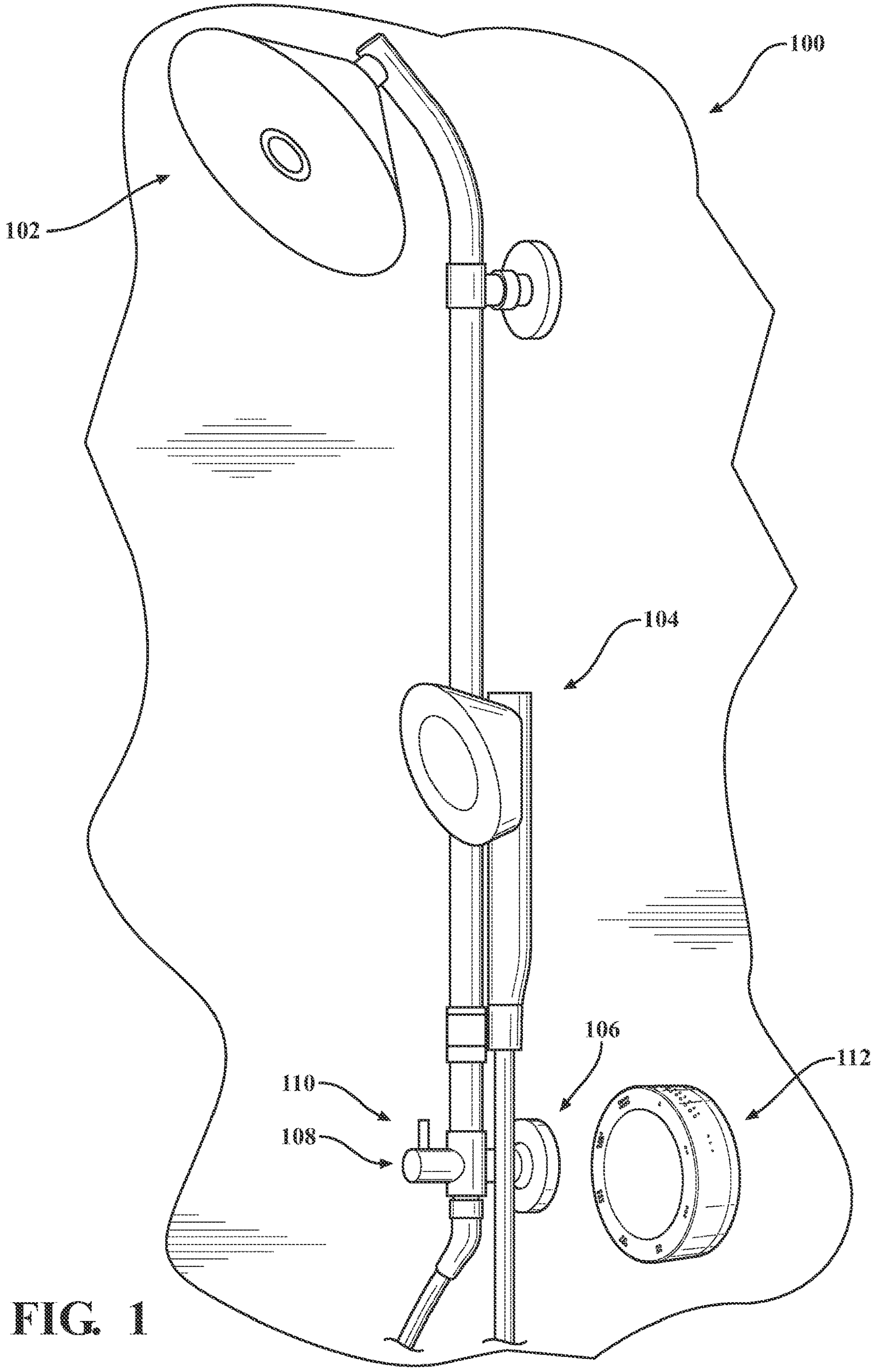
FIG. 1 is a perspective view of a shower environment, according to an exemplary embodiment.

Referring to FIG. 1, a perspective view of a shower environment 100 is shown. The shower environment 100 may be shower cell with plastic or tiled sidewalls, and/or any other type of environment in which a shower can be installed. The shower environment 100 may include a rainhead sprayer 102 and a handheld sprayer 104. In some embodiments, the shower environment 100 includes one of the rainhead sprayer 102 or the handheld sprayer 104. The rainhead sprayer 102 and the handheld sprayer 104 are configured to receive a flow of water from a utility conduit 106. The utility conduit 106 may extend from a wall or other vertical or near-vertical surface of the shower environment 100. The utility conduit 106 by be operatively opened and closed by an on/off valve 108. The on/off valve 108 may be operated by a user of the shower environment 100.

The shower environment 100 may further include a manual diverter 110, configured to direct the flow of water from the utility conduit 106 to either the rainhead sprayer 102, the handheld sprayer 104, or both at the same time. If the user of the shower environment 100 prefers to only use the rainhead sprayer 102, the user may operate the manual diverter 110 to direct the flow of water from the utility conduit 106 to rainhead sprayer 102 and prevent the flow of water from flowing toward the handheld sprayer 104. In some embodiments, the manual diverter 110 may be electronically actuated.

As shown in FIG. 1, the shower environment further includes a control puck 112. Generally speaking, the control puck 112 electronically communicates with the rainhead sprayer 102 and the handheld sprayer 104 to control a spray pattern (e.g., spray mode, etc.) exiting the rainhead sprayer 102 or the handheld sprayer 104. In some embodiments, the control puck 112 is not present and the shower environment 100 may be controlled manually by the user, interacting with the rainhead sprayer 102, the handheld sprayer 104, the on/off valve 108, and the manual diverter 110.

Figure 2:
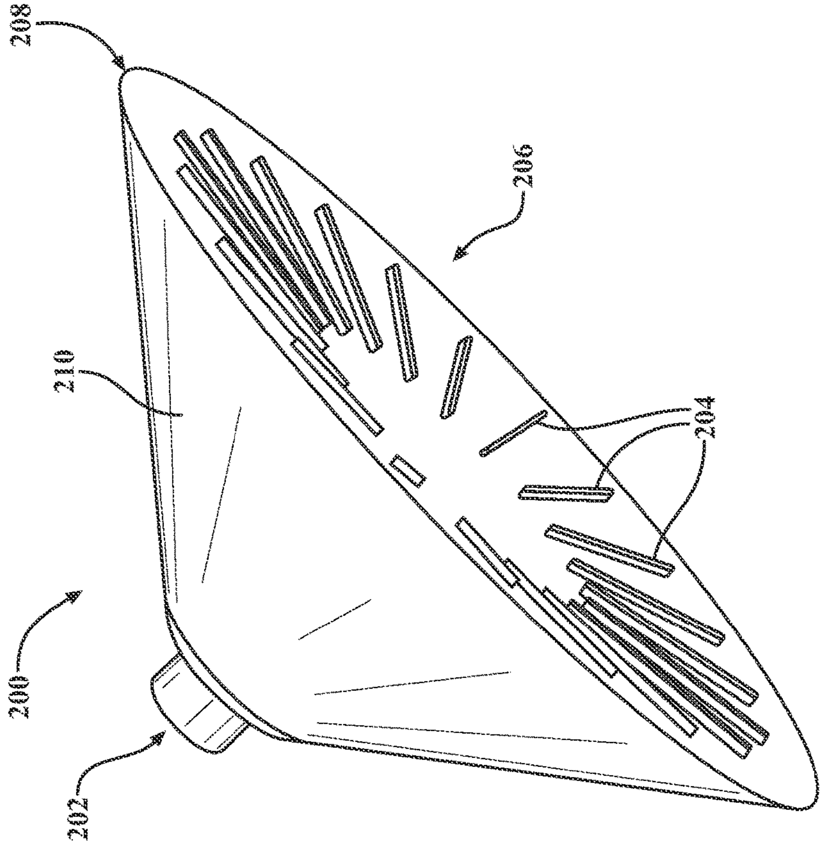
FIG. 2 is a perspective view of a sprayer which can be used in the shower environment of FIG. 1, according to an exemplary embodiment.

Referring to FIG. 2, a perspective view of a sprayer is shown as a sprayer 200. The sprayer 200 may be an overhead sprayer, a rainhead sprayer (e.g., the rainhead sprayer 102), or a handheld sprayer (e.g., the handheld sprayer 104). The sprayer 200 includes a water inlet 202 and a water outlet 204. In some embodiments, the sprayer 200 has a plurality of water outlets 204, forming an outlet pattern 206 (i.e., some or all of the water outlets 204), configured to provide the spray pattern when water flows through the sprayer 200. The sprayer 200 may be configured to provide one or more different spray patterns, such as a "rain" pattern, a deluge or "rinse" pattern, a "mist" pattern, or other spray patterns. As used herein, the term "spray pattern" should be understood as characterizing the water flowing out of the sprayer 200 via the water outlets 204. Characteristics of a given spray pattern may include for example, a particular set or subset of the water outlets 204 from which the water is discharged from the sprayer 200, a flowrate (e.g., volume or mass flowrate) of the water exiting the sprayer 200 via the water outlets 204, a diameter or cross-sectional area of the water streams exiting the water outlets 204, a flow velocity or speed of the water streams exiting the water outlets 204, an angle or direction of the water streams exiting the water outlets 204 (e.g., parallel water streams, diverging water streams, etc.), or any other attribute or characteristic that can be used to describe the water output of the sprayer 200. The term "spray mode" is used interchangeably with "spray pattern" throughout the present disclosure. In some embodiments, the sprayer 200 is configured to provide a plurality of different spray patterns and switch between the different spray patterns by selectively controlling the flow of water to different subsets of the water outlets 204. The sprayer 200 may provide the different spray patterns by operating internal components within the sprayer 200 to divert the water to the different subsets of the water outlets 204 (described in greater detail below).

The sprayer 200 further includes a face 208 and a housing 210. The face 208 includes the outlet pattern 206. As shown in FIG. 2, the face 208 may define a generally annular shape having the outlet pattern 206 forming a radially symmetrical pattern. In some embodiments, the face 208 may define a shape resembling a variety of polygon shapes, such as a square, oval, star, and so on. The housing 210 may define a frustoconical shape, widest at the face 208, and tapering toward the water inlet 202. In some embodiments, the housing 210 defines a different shape, such as a hemisphere, a rectangular prism, a cone, a pyramid, or various other shapes. In some embodiments, the face 208 is a portion of the housing 210.

Figure 3:
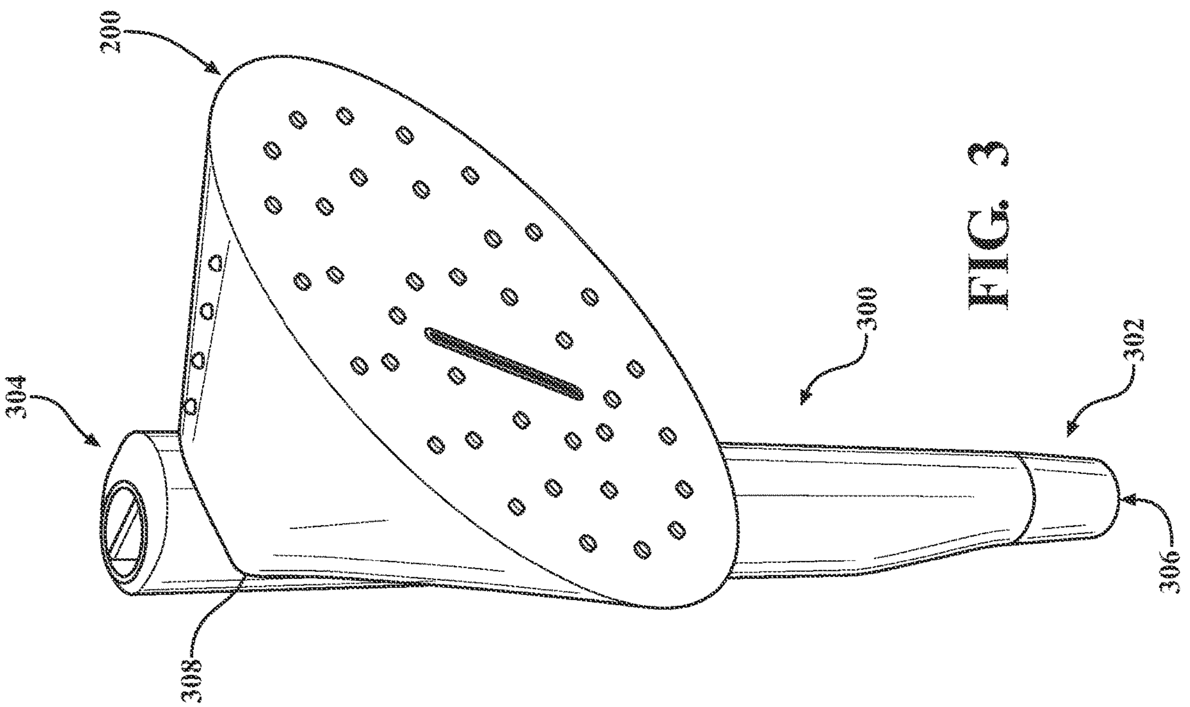
FIG. 3 is another perspective view of the sprayer of FIG. 2, according to an exemplary embodiment.

Referring to FIG. 3, the sprayer 200 is shown fluidly coupled to a handle 300. The handle 300 defines a first handle end 302 and a second handle end 304. Proximate the first handle end 302 may be a handle inlet 306, structured to receive a flow of water. Proximate the second handle end 304 may be a handle outlet 308. Fluidly coupled to the handle outlet 308 may be the sprayer 200, configured to receive a flow of water from the handle 300 via the handle outlet 308. The sprayer 200 behaves similarly, whether fluidly coupled to an overhead portion of the shower environment 100 or fluidly coupled to the handle 300. The sprayer 200, and more specifically an electronic diverter within the sprayer 200, communicates with the control puck 112, receiving instructions to provide a spray mode or spray pattern to the shower environment 100.

Figure 4:
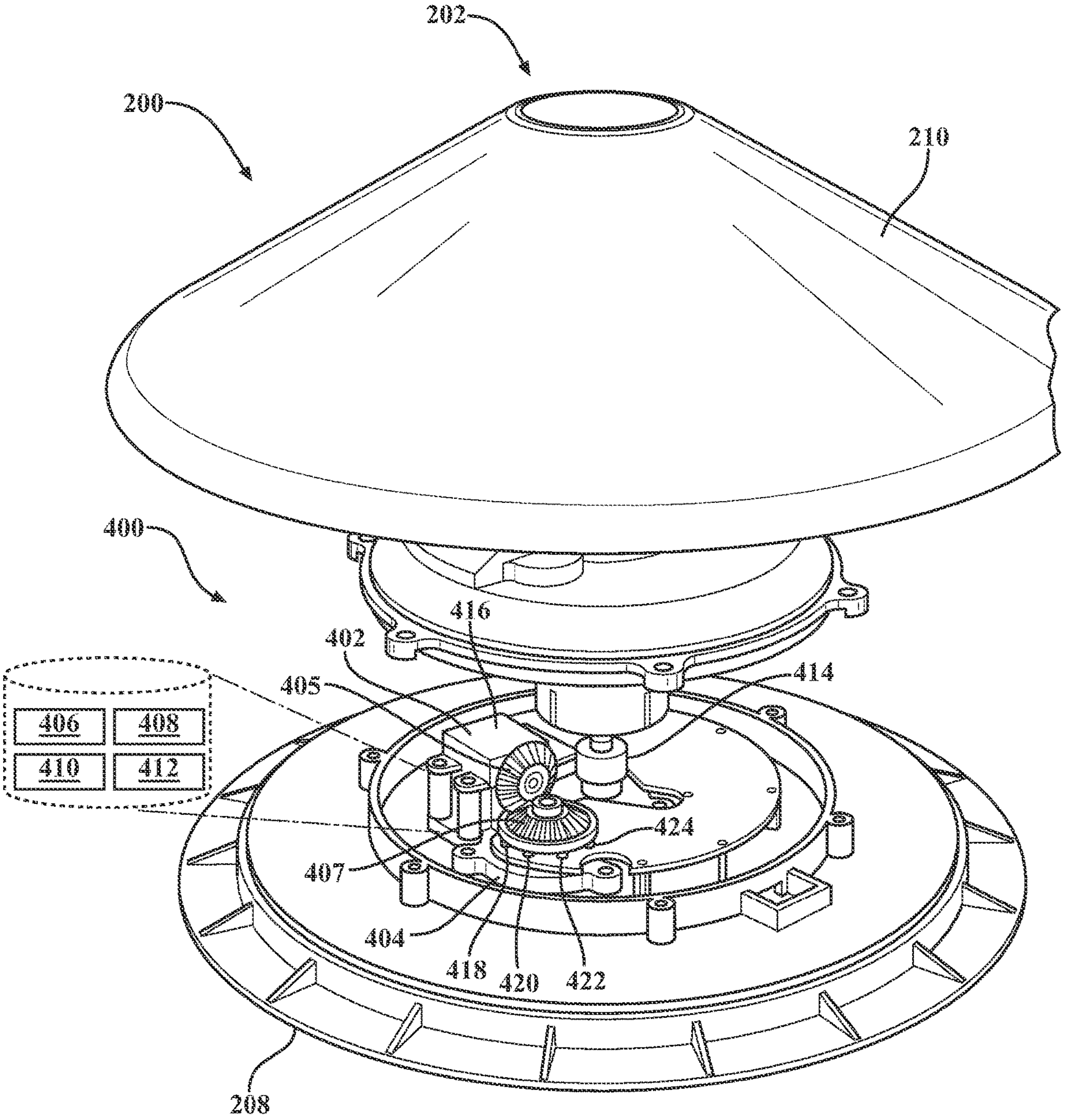
FIG. 4 is an exploded view of the sprayer of FIG. 2, according to an exemplary embodiment.

Referring now to FIG. 4, an electronic diverter 400 is shown, according to an exemplary embodiment. The electronic diverter 400 is positioned within the sprayer 200. In some embodiments, the electronic diverter 400 is positioned within a cavity defined by the housing 210 and the face 208. The electronic diverter 400 is configured to receive an electronic signal from the control puck 112 with instructions to change the spray pattern exiting the sprayer 200. The electronic diverter 400 is in fluid communication with both the water inlet 202 and the water outlet 204. In some embodiments, water must pass through the electronic diverter 400 before exiting the sprayer 200 via the outlet pattern 206.

Generally speaking, the electronic diverter 400 includes an actuator 402, structured to actuate a pattern wheel 404 within the sprayer 200 to change the spray pattern exiting the sprayer 200 without requiring a user to physically interface with the sprayer 200. The actuator 402 may operate the pattern wheel 404 between a first end position (e.g., all the way counterclockwise) and a second end positon (e.g., all the way clockwise), the first end position corresponding to a first spray pattern (e.g., "shower") and the second end position corresponding to a second spray pattern (e.g., "mist"). In some embodiments, one or more intermediate positions of the pattern wheel 404 exist between the first end position and the second end position. Each of the intermediate positions may correspond to a different spray pattern, which can be selected by the actuator 402 moving the pattern wheel 404 into the desired position. In some embodiments, each position of the pattern wheel 404 (e.g., each end position and each intermediate position) corresponds to a different flow pattern. For example, each position of the pattern wheel 404 may divert the water within the sprayer 200 to a different subset of the water outlets 204 or otherwise affect the characteristics of the water exiting the sprayer 200 to achieve a different flow pattern. However, it is contemplated that in some embodiments two or more positions of the pattern wheel 404 may correspond to the same flow pattern by causing the water to exit the water outlets 204 with the same characteristics. In some embodiments, the pattern wheel 404 is continuously rotatable in either direction and does not have end positions that define rotational limits of the pattern wheel 404. The pattern wheel 404 may be capable of moving between any given position to any other given position by rotating either clockwise or counterclockwise. For example, a transition from position A to position B can be achieved by rotating the pattern wheel 404 clockwise by X degrees (e.g., 30 degrees, 90 degrees, 180 degrees, etc.), or by rotating the pattern wheel counterclockwise by 360−X degrees (e.g., 330 degrees, 270 degrees, 180 degrees, etc.). Additionally, the pattern wheel 404 can continuously rotate in the clockwise direction or the counterclockwise direction such that reversing direction is not required to achieve a given position.

The actuator 402 may be an electric motor, a servo motor, or a similar system. In some embodiments, the face 208 is rotatable relative to the housing 210 such that rotation of the face 208 changes the spray pattern exiting the sprayer 200. In some embodiments, the actuator 402 is operatively coupled to the face 208, the actuator 402 configured to rotate the face 208 and change the spray pattern exiting the sprayer 200. In some embodiments, the pattern wheel 404 and the face 208 are combined into a single component. In some embodiments, the actuator 402 is coupled to a first gear 405, such as a bevel gear, a mitre gear, or a worm gear, formed of metal, plastic, a polymer, nylon, or other suitable material for a gear. The first gear 405 my engage a second gear 407, the second gear 407 coupled to the pattern wheel 404 and structured to rotate the pattern wheel 404 when force is applied to the second gear 407 (e.g., by the first gear 405, by the actuator 402, etc.).

The electronic diverter 400 may further include a processor, shown as a diverter logic 406, a diverter memory 408, and a wireless communication device, shown as a diverter communication 410. The diverter logic 406 may be operatively coupled to the actuator 402 and configured to send electronic signals (e.g., voltage signals, current signals, etc.) to the actuator 402 to operate the actuator 402. The diverter memory 408 may include instructions that the diverter logic 406 may receive in order to operate the actuator 402. For example, if the diverter logic 406 wants to operate the actuator 402 at 3.7 volts for 2 seconds, the instructions for doing so may be received from the diverter memory 408.

The diverter communication 410 is a wireless communication device, configured to send signals to and receive signals from the control puck 112 or any other device capable of providing or receiving signals (e.g., a mobile phone, a tablet, a remote control panel, etc.). The diverter communication 410 may be configured to send and receive Bluetooth signals, radio frequency (RF) signals, near field communication (NFC) signals, Wi-Fi signals, infrared signals, or similar wireless communication signals. For example, the diverter communication 410 may receive a signal from the control puck 112 to change the spray pattern to "mist." The signal is transmitted to the diverter logic 406, which access the diverter memory 408 for instructions on how to operate the actuator 402 to set the spray pattern to "mist." Once the diverter logic 406 receives the instructions, the diverter logic 406 may send control signals to the actuator 402 to rotate the pattern wheel 404 (e.g., the face 208) to "mist."

In some embodiments, the diverter communication 410 is configured to send signals to, and receive signals from, a user device capable of sending wireless signals to the electronic diverter 400. For example, a user of the shower environment 100 may not need to use or purchase the control puck 112 to control the electronic diverter 400 and may instead use a user device (e.g., personal computing device, cell phone, tablet, smart home assistant, voice assistant, etc.) to control the electronic diverter 400. For example, the user device may "pair" with the electronic diverter 400 through a software application downloaded on the user device. The user may then interface with the user device to set a spray pattern. In some embodiments, the electronic diverter 400 further includes a microphone operably coupled to the diverter logic 406, configured to receive voice commands, translate the voice commands into computer readable language, and control the actuator 402 and the pattern wheel 404 in response to the translated voice commands.

The electronic diverter 400 may further include a power supply 412. The power supply 412 may include disposable batteries, rechargeable batters, or a generator that converts the kinetic energy of water flowing through the sprayer 200 into electricity to power the electronic diverter 400. The power supply 412 is configured to power on the diverter logic 406 and the actuator 402. The electronic diverter 400 may also include a flow sensor 414. The flow sensor 414 may be configured to sense a flow of water entering the sprayer 200. In some embodiments, the flow sensor 414 is configured to sense a flow of water into the electronic diverter 400. The flow sensor 414 may be configured to send a "power on" signal to the electronic diverter 400 in response to detecting a flow of water entering, exiting, or flowing though the electronic diverter 400 or the sprayer 200. In some embodiments, the flow sensor 414 is configured to send a "power off" signal to the electronic diverter 400 in response to detecting that there is substantially no flow of water entering, exiting, or flowing through the electronic diverter 400 or the sprayer 200. In some embodiments, the flow sensor 414 is configured to communicate directly with the control puck 112, the flow sensor 414 configured to send a signal to the control puck 112 indicating the power status (e.g., on, off, standby, etc.) of the electronic diverter 400 and/or the flow status (e.g., water is flowing, water is not flowing) of the sprayer 200.

In some embodiments, the actuator 402 further comprises a sensor, shown as a sensor 416. In some embodiments, the sensor 416 is an encoder. The sensor 416 may be an absolute encoder or an incremental encoder. The sensor 416 is configured to cooperate with the diverter logic 406, signaling to the diverter logic 406 a position of the actuator 402 and a position of the pattern wheel 404. The position of the actuator 402 may directly correspond to the position of the pattern wheel 404. The position of the pattern wheel 404 may correspond to a spray pattern exiting the sprayer 200. For example, the pattern wheel 404 may be set to "shower" when the user of the shower environment 100 turns off the on/off valve 108. Turning off the on/off valve 108 will stop water from flowing through the electronic diverter 400, causing the flow sensor 414 to send a "power off" signal to the electronic diverter 400. When the user interfaces with the on/off valve 108 and turns the water on, it may be desirable, in some embodiments, that the electronic diverter 400 "remember" the position of the pattern wheel 404 and the spray pattern currently set to exit from the sprayer 200. In some embodiments, the electronic diverter 400 may reset after powering on, the electronic diverter 400 configured to send a signal to the actuator 402 to position the pattern wheel 404 to a default pattern (e.g., "shower", etc.). In some embodiments, the electronic diverter 400 may reset just prior to powering off such that after the "power off" signal is received from the flow sensor 414, the diverter logic 406 sends a signal to the actuator 402 to position the pattern wheel 404 to a default pattern. In some embodiments, the current spray pattern is stored in the diverter memory 408 prior to powering off such that the electronic diverter 400 can receive, from the diverter memory 408, the position of the pattern wheel 404 upon receiving a "power on" signal from the flow sensor 414. In some embodiments, the actuator 402 includes the sensor 416, which is an absolute encoder, which may signal the position of the pattern wheel 404 to the diverter logic 406 when the electronic diverter 400 powers on.

In some embodiments, the sensor 416 is integrated into the second gear 407. As shown in FIG. 4, the sensor 416 may be positioned proximate to an underside of the second gear 407 (e.g., a side of the second gear 407 that does not engage the first gear 405). The underside of the second gear 407 may include a barcode, magnetic strips, iron fillings, or similar features that may be detected by the sensor 416. In some embodiments, the sensor 416 includes a "contact" encoder, or an encoder that interfaces with the second gear 407 to determine the positon of the second gear 407, and thus the position of the pattern wheel 404. In some embodiments, the sensor 416 is a Hall Effect sensor and cooperates with the second gear 407 to form a Hall Effect encoder, the sensor 416 configured to detect changes in the magnetic field as the second gear 407 rotates to change the spray pattern.

As shown in FIG. 4, the electronic diverter 400 includes four sensors 416, shown as a first sensor 418, a second sensor 420, a third sensor 422, and a fourth sensor 424 (e.g., "the sensors 416"). The pattern wheel 404 is configured to be operable in four different positions to facilitate the output of four different spray patterns. The sensors 416 may be positioned equidistant from one another, set apart by n-rotational degrees, where n may be or may not be approximately 90, 60, 45, or 30 degrees, to name a few examples. The second gear 407 may include a single feature, such as a magnet, divot, pin, or similar feature that may be detected by the sensors 416. Thus, if the pattern wheel 404 is in a third position (e.g., "mist"), the third sensor 422 may detect the single feature of the second gear 407 and send a signal to the diverter logic 406 that the pattern wheel 404 is in the third position, or "mist." Including four sensors 416 may provide the technical benefit of preventing encoder drift, as the sensors 416 are configured to detect the single feature. Further, the four sensors 416 may provide the technical benefit of allowing the diverter logic 406 to know what position the pattern wheel 404 is in when the electronic diverter 400 turns on. For example, if the pattern wheel 404 was in the second position when the electronic diverter 400 powered off, the second sensor 420 would detect the single feature of the second gear 407. When the electronic diverter 400 is powered on again, the single feature of the second gear 407 would be immediately detected by (e.g., within half of one second) the second sensor 420, and the second sensor 420 would send a signal to the diverter logic 406 that the pattern wheel 404 is in the second position. This feature provides the technical benefit of avoiding a calibration set by the sensors 416 upon powering up the electronic diverter 400, as there is only the single feature of the second gear 407 to detect.

In some embodiments, the electronic diverter 400 is unable to completely prevent a flow of water from flowing through the sprayer 200. For example, if the user of the shower environment 100 turns on the on/off valve 108 to take a shower, water will flow thorough the sprayer 200, and thus flow through the electronic diverter 400. This may be desirable in some embodiments to prevent high pressures from building up in the sprayer 200, and to allow the flow sensor 414 to properly sense a flow of water. In some embodiments, the electronic diverter 400 is configured to stop a flow of water from flowing through the sprayer 200.

Stored within the diverter memory 408 may be a catalog of different spray patterns. The diverter memory 408 may store as few as one spray pattern and as many as 1,000 spray patterns. When the diverter logic 406 receives instructions to change the spray pattern, the diverter logic 406 may receive the operating instructions for making the change from the diverter memory 408 and execute the instructions. In some embodiments, the electronic diverter 400 does not have the instructions stored in the diverter memory 408, but instead receives the instructions directly from the control puck 112 or a user device.

The pattern wheel 404 may be selectively repositionable within the sprayer 200. The pattern wheel 404 may rotate clockwise to change between different positions. In some embodiments, the pattern wheel 404 may rotate counter-clockwise to change between different positions. The pattern wheel 404 is defined to contain a plurality of spray patterns, where the different spray patterns may be actuated by rotating the pattern wheel 404 between different positions. The disclosed embodiment allows the pattern wheel 404 to control the spray pattern such that the flow of water is not disrupted changing between different spray patterns. In traditional electronic diverters, each set of water outlets is typically fluidly coupled to a different water line that extends through the water hose that provides water to the sprayer and connects to a set of control valves mounted within or behind the wall. In such traditional systems, the flow of water is controlled significantly upstream of the water outlets (e.g., within the wall) by operating on/off valves that control the flow of water through each separate water line. Accordingly, switching between different flow patterns in such conventional systems often requires the sprayer to discharge any (room temperature) water within the newly selected water line before the desired temperature water reaches the water outlets, leading to noticeable changes in discharged water temperature when switching to a new spray pattern. Advantageously, the sprayer 200 described herein avoids this by switching between the different spray patterns within the sprayer 200 itself (e.g., by operating the pattern wheel 404), such that the water temperature does not noticeably change when switching between spray patterns.

The pattern wheel 404 is further defined to have a spray pattern formation time. The spray pattern formation time is defined to be the amount of time that the pattern wheel 404 needs to remain in a given position for the water discharge to form the corresponding spray pattern. The spray pattern formation time is configured to include a pressure build up time, where the water pressure in the system may rise before it may be discharged. The pressure build up time is configured to occur when the pattern wheel 404 is in a static position. In some embodiments, the pressure build up time may be configured to occur when the pattern wheel 404 is in a kinetic position (e.g., the pattern wheel 404 is rotating between different positions). The spray pattern formation time is further defined to be between a time interval of 0.5 to 0.7 seconds. In some embodiments, the spray formation time may take longer than 0.7 seconds to build water pressure.

The pattern wheel 404 is defined to contain the plurality of spray patterns where the different spray patterns may be selectively engaged by rotating the pattern wheel 404. The pattern wheel 404 is further defined to have a fast rotation between positions, such that the when the pattern wheel 404 transitions between the first position and a third position, the pattern wheel 404 remains in the intermediate second position for less than the spray pattern formation time. Thus, from the perspective of the user, the transition between the first position and the third position occurs without forming the spray pattern in the second position, even though the pattern wheel 404 rotates through the second position when making the transition between the first position and the third position. In some embodiments, the pattern wheel 404 may also rotate through a fourth position when making the transition between the first position and the third position.

Figure 5:
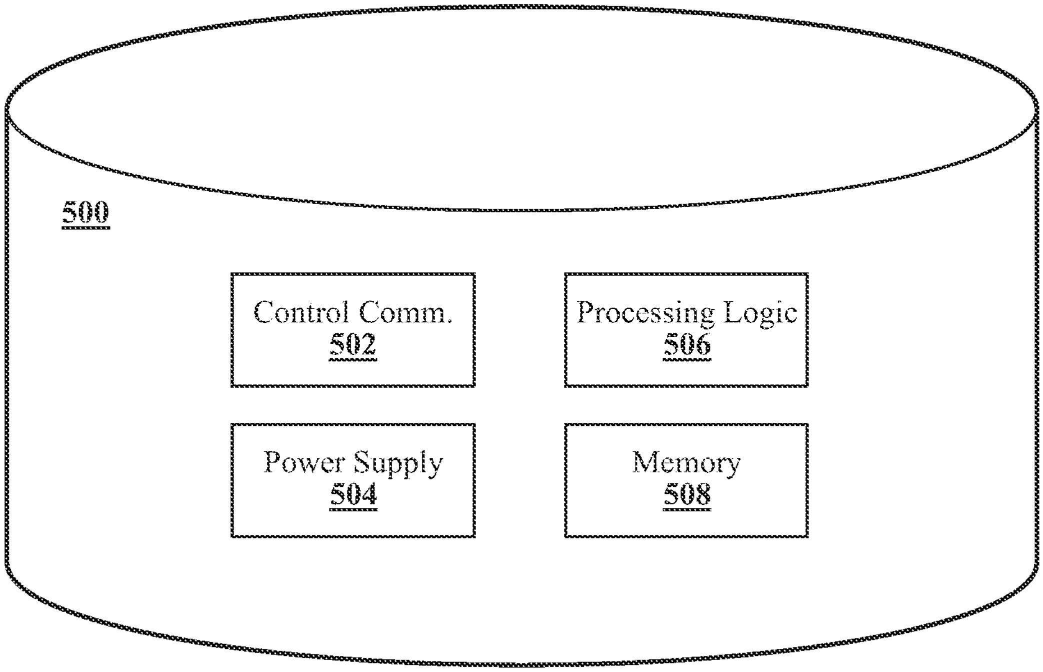
FIG. 5 is a block diagram of a spray controller which can be used in the shower environment of FIG. 1, according to an exemplary embodiment.

Referring now to FIG. 5, a control module (e.g., remote control, control interface, etc.) is shown as a spray controller 500. The spray controller 500 is configured to effect contactless control of the electronic diverter 400, and thus the sprayer 200. The spray controller 500 includes a wireless communication device (e.g., control communication 502), a power supply 504, a processing logic 506, and a memory 508. Speaking generally, the spray controller 500 is able to communicate with the diverter communication 410. The spray controller 500 may transmit, via the control communication 502, an instruction to the electronic diverter 400 to change the spray pattern to "massage." The diverter communication 410 may receive the signal and relay the signal to the diverter logic 406. The diverter logic 406 may then actuate the actuator 402 to position the pattern wheel 404 to "massage."

The control communication 502 is configured to send signals to and receive signals from the diverter communication 410. The control communication 502 may send signals such as Bluetooth signals, radio frequency (RF) signals, near field communication (NFC) signals, Wi-Fi signals, and similar signal transmission types.

The power supply 504 is configured to power the spray controller 500. The power supply 504 may include disposable batteries (e.g., alkaline, lithium, zinc-air, etc.) or rechargeable batteries (lithium ion, nickel-cadmium, etc.). The spray controller 500 may plug into an outlet and receive either AC or DC current. In some embodiments, the spray controller 500 is powered wirelessly by inductive charging. For example, the spray controller 500 may be mounted to a wall, behind which a wireless charger (e.g., copper coil, magnetic loop antenna, etc.) is positioned. The wireless charger may then interface with the power supply 504, the power supply 504 structured to wirelessly charge by the wireless charger positioned behind the wall.

The processing logic 506 is configured to send signals to, and receive signals from, the diverter communication 410 via the control communication 502. The processing logic 506 may be operably coupled to the memory 508, where instructions for how to respond to various signals is stored. The memory 508 may be a non-transitory memory that includes instructions. In some embodiments, the instructions are added to the memory 508 during manufacturing and inaccessible to a user. For example, the memory 508 may store instructions for how the electronic diverter 400 is to be controlled to change the spray pattern from "mist" to "shower." The memory 508 may be structured such that a user is unable to change how the electronic diverter 400 responds to receiving the instruction "mist" from spray controller 500.

A button may be operably coupled to the spray controller 500 such that actuation of the button sends a signal to the processing logic 506. The button may be a push button, a capacitive button, a touch sensor, a proximity sensor, a heat sensor, a beam-break sensor, or rendered on a screen to be operated by either touch or a mouse cursor. For example, the spray controller 500 may include a push button corresponding to the spray pattern "massage." When the "massage" button is actuated, the button may send a signal to the processing logic 506, prompting the processing logic 506 to compare the signal received with a set of instructions stored in the memory 508. Once the instructions are received by the processing logic 506, the processing logic 506 prompts the control communication 502 to send a signal to the electronic diverter 400 to change the spray pattern to "massage." In some embodiments, the spray controller 500 will send the signal regardless of the power state of the electronic diverter 400 (e.g., whether or not the electronic diverter 400 is on). In some embodiments, the diverter communication 410 is further configured to send a signal to the spray controller 500, the signal indicating to the processing logic 506 that there is no flow of water through the sprayer 200 (e.g., the electronic diverter 400) and not to send a signal. In some embodiments, the spray controller 500 may send the signal to two different sprayers (e.g., the sprayer 200 and an additional sprayer 200, the rainhead sprayer 102 and the handheld sprayer 104). For example, if the shower environment 100 includes both the rainhead sprayer 102 and the handheld sprayer 104, the spray controller 500 may send the same signal (e.g., "shower") to both the rainhead sprayer 102 and the handheld sprayer 104.

Figure 6:
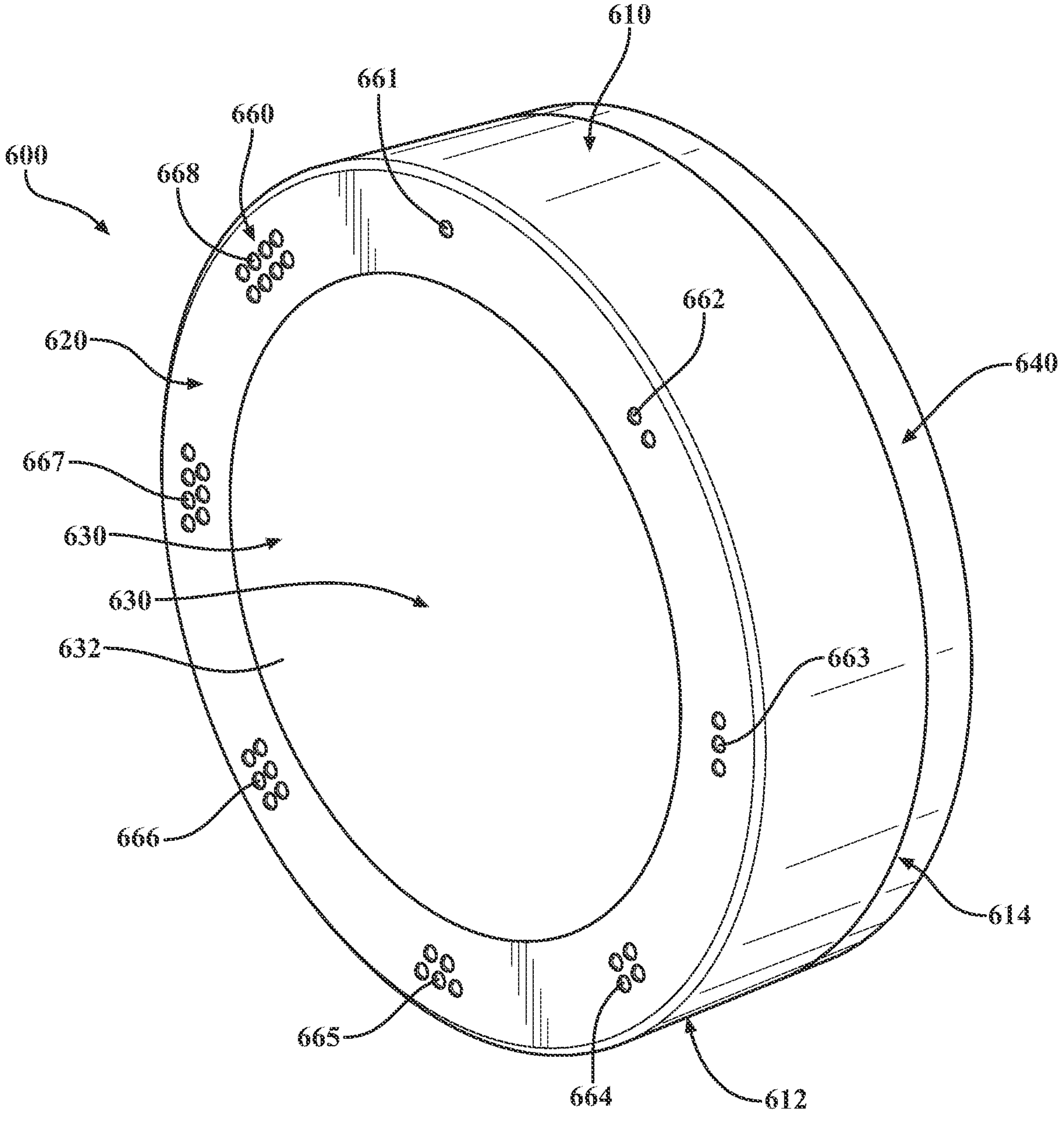
FIG. 6 is a perspective view of a control puck which may function as the spray controller of FIG. 5, according to an exemplary embodiment.

Turning now to FIG. 6, a first embodiment of the control puck 112 is shown as a control puck 600. The control puck 600 includes a puck housing 610, an interface ring 620, a center portion 630, and a mounting body 640. The puck housing 610 defines a generally annular body. In some embodiments, the puck housing 610 defines a different shape, such as a square, a hexagon, an octagon, and similar shapes. The puck housing 610 may be manufactured from plastic, metal, wood, an elastomer, or similar material. In some embodiments, the puck housing 610 may be manufactured from a non-corrosive material that can withstand the wet environment of a shower environment (e.g., water, soap, etc.). The puck housing 610 includes a first housing end 612 and a second housing end 614 opposite the first housing end 612. The interface ring 620 is coupled to the puck housing 610 proximate the first housing end 612, forming a watertight seal between the puck housing 610 and the interface ring 620. Disposed within the puck housing 610 may be the spray controller 500. In some embodiments, the watertight seal between the puck housing 610 and the interface ring 620 prevents water from corroding and shorting out the spray controller 500 housing within the control puck 600.

The center portion 630 may be positioned at a center of the interface ring 620. The center portion 630 may form a watertight seal with the interface ring 620 to prevent water from entering the puck housing 610. In some embodiments, the center portion 630 is coupled to the puck housing 610 proximate the first housing end 612 via adhesive or fasteners. The interface ring 620 may be stretched over (e.g., positioned over, etc.) the puck housing 610 and the center portion 630, behaving similarly to an end cap. The center portion 630 may include a decorative front surface 632, including aesthetically pleasing patterns. In some embodiments, the center portion 630 is formed of metal, the front surface 632 having a reflective surface finish. In some embodiments, the front surface 632 may be brushed nickel, hammered copper, stainless steel, sandblasted aluminum, or similar finishes. In some embodiments, the center portion 630 is chromed plastic.

The interface ring 620 is structured to be interactive, such as by a user of the shower environment 100. The interface ring 620 may be formed by an elastomer exhibiting an inherent compliance when pressed. In some embodiments, the interface ring 620 extends over the puck housing 610 such that the puck housing 610 is hidden from view when the puck housing 610 is coupled to the mounting body 640. This may be preferable in some embodiments as the interface ring 620, formed of an elastomer, may improve the grip a user has on the control puck 600. In other embodiments, the interface ring 620 serves as a bumper to protect the control puck 600 from scratches, nicks, and bumps during handling by a user to, say, replace the batteries or clean.

The mounting body 640 is configured to be coupled to a wall or other vertical or near-vertical surface. For example, the mounting body 640 may be coupled to a wall in the shower environment 100. The mounting body 640 is configured to be removably coupled to the puck housing 610 proximate the second housing end 614. The puck housing 610 may be removably coupled to the mounting body 640 using latches, snaps, bayonet latches, magnets, or similar latching systems. The puck housing 610 may be coupled to the mounting body 640 such that a quarter-turn of the puck housing 610 releases the puck housing 610 from the mounting body 640.

It may be desirable in some embodiments that the mounting body 640 be coupled to a wall in a shower environment by fasteners, adhesive, double-sided tape, and similar mounting and coupling systems. However, the puck housing 610 may be removably coupled to the mounting body 640 such that the puck housing 610 may be easily removed from the shower environment 100 by a user. For example, the control puck 600 may include disposable batteries for the power supply 504. To replace the batteries, the puck housing 610 may be removed from the mounting body 640, and thus removed from the shower environment 100. In some embodiments the mounting body 640 and the puck housing 610 form a watertight seal where the mounting body 640 and the puck housing 610 interface. This may be desirable in some embodiments to prevent water, soap, and other foreign bodies from corroding the power supply 504.

Each of the puck housing 610, the interface ring 620, and the mounting body 640 define a diameter, shown as a puck diameter 645. The puck diameter 645 may be structured to be comfortable when held in an adult hand (e.g., 4-5 inches, inclusive). In some embodiments, the puck diameter 645 may be 4.5 inches. When coupled together, an outer surface of each of the puck housing 610, the interface ring 620, and the mounting body 640 are contiguous to provide an aesthetically pleasing smooth outer surface. In some embodiments, it may be desirable to add a ribbing to the puck housing 610 to provide a grip (e.g., a surface having a higher coefficient of friction than a smooth surface) for a user if the puck housing 610 is wet.

Figure 7:
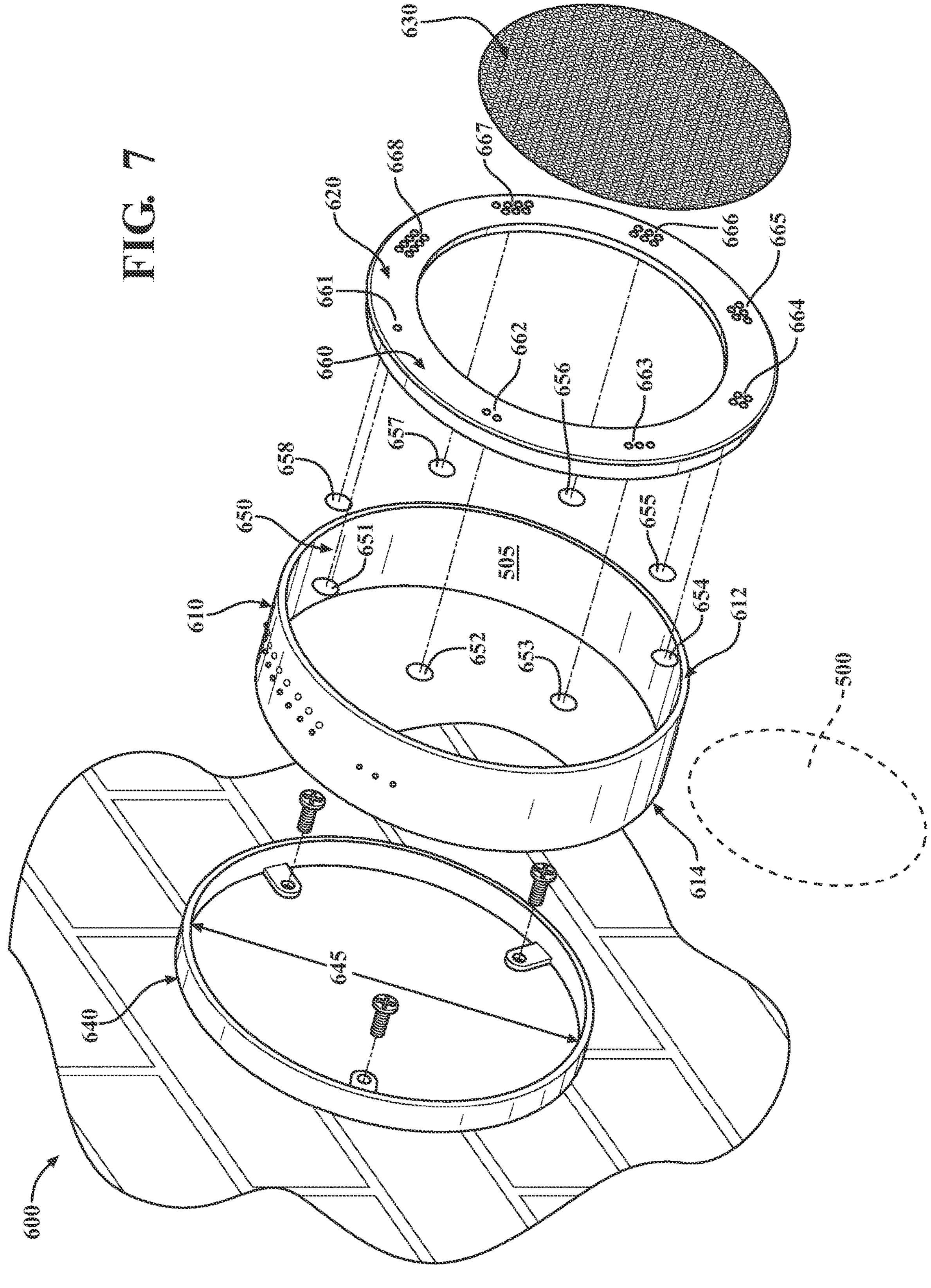
FIG. 7 is an exploded view of the control puck of FIG. 6, according to an exemplary embodiment.

Turning now to FIG. 7, an exploded view of the control puck 600 is shown. Positioned between the puck housing 610 and the interface ring 620 may be a plurality of buttons 650. When the puck housing 610 is coupled to the interface ring 620, the plurality of buttons 650 may be positioned between the puck housing 610 and the interface ring 620 such that a force applied to the interface ring 620 in a direction generally toward the mounting body 640 may actuate one of the plurality of buttons 650.

Speaking more specifically, the plurality of buttons 650 includes a first button 651, a second button 652, a third button 653, a fourth button 654, a fifth button 655, a sixth button 656, a seventh button 657, and an eighth button 658. Each of the plurality of buttons 650 is operatively coupled to the processing logic 506 of the spray controller 500 such that actuation of any of the plurality of buttons 650 sends a signal to the processing logic 506, prompting the processing logic 506 to complete a series of steps.

The interface ring 620 may further include a plurality of indicia 660. The indicia 660 correspond to the plurality of buttons 650 positioned behind the interface ring 620 (e.g., between the interface ring 620 and the puck housing 610). More specifically, the interface ring 620 may include a first indicia 661 corresponding to the first button 651, a second indicia 662 corresponding to the second button 652, a third indicia 663 corresponding to the third button 653, a fourth indicia 664 corresponding to the fourth button 654, a fifth indicia 665 corresponding to the fifth button 655, a sixth indicia 666 corresponding to a sixth button 656, a seventh indicia 667 corresponding to the seventh button 657, and an eighth indicia 668 corresponding to an eighth button 658. For example, a force applied to the third indicia 663 in a direction generally toward the puck housing 610 will actuate the third button 653 positioned behind the interface ring 620.

In some embodiments, the indicia 660 are raised bumps, integrally formed with the interface ring 620. It may be desirable in some embodiments that the indicia 660 be physically distinguishable from each other such that a user with their eyes closed in the shower environment 100 may be able to feel the difference between the indicia 660 (e.g., may be able to feel the difference between the first indicia 661 and the fourth indicia 664) such that the user is able to actuate the button that they wish to actuate without having to open their eyes. In some embodiments, the indicia 660 are removably coupled to the interface ring 620 such that the indicia 660 may be removed and replaced with a new indicia (e.g., the first indicia 661 may be removed and replaced with a new (e.g., ninth) indicia). The indicia 660 may be customizable by the user. In some embodiments, the indicia 660 are raised symbols corresponding to the spray pattern that is effected by actuation of the corresponding button. For example, actuation of the first button 651 may signal to the electronic diverter 400 to change the spay pattern to "mist." The first indicia 661 may be a raised, speckled pattern that corresponds to "mist."

The processing logic 506 may be configured to provide instructions for four spray patterns, referred to herein as "spray 1", "spray 2", "spray 3", and "spray 4". When the first indicia 661 is pressed and the first button 651 is actuated, the processing logic 506 is prompted to send a signal to the electronic diverter 400 to switch the spray pattern to "spray 1." Likewise, when the second indicia 662 is pressed and the second button 652 is actuated, the processing logic 506 is prompted to send a signal to the electronic diverter 400 to switch the spray pattern to "spray 2." When the third indicia 663 is pressed and the third button 653 is actuated, the electronic diverter 400 switches to "spray 3", and when the fourth indicia 664 is pressed and the fourth button 654 is actuated, the electronic diverter 400 switches to "spray 4". The first button 651, the second button 652, the third button 653, and the fourth button 654 may be collectively referred to as mode buttons 1234. When any one of the mode buttons 1234 is actuated, the processing logic 506 sends a signal to the electronic diverter 400 to change the spray pattern for an indefinite length of time. In some embodiments, the electronic diverter 400, even if powered off and then on again, will not change the spray pattern until a signal is sent by the processing logic 506 to change the spray pattern. In some embodiments, the electronic diverter 400 restarts each time the electronic diverter 400 is powered off, changing to "spray 1" (or some other default reset spray pattern) when starting up again. The mode buttons 1234 may be set during manufacturing and unable to be changed by the user of the shower environment 100.

The fifth button 655, the sixth button 656, the seventh button 657, and the eighth button 658 may be collectively referred to as program buttons 5678. In some embodiments, the program buttons 5678 behave similarly to the mode buttons 1234 and are not able to be changed by the user. In some embodiments, the program buttons 5678 are preset by the manufacturer such that when actuated, the processing logic 506 sends a signal to the electronic diverter 400 to change the spray pattern, the electronic diverter 400 following a series of instructions over a given amount of time. For example, if the fifth indicia 665 is pressed by a user and the fifth button 655 is actuated, the processing logic 506 may be prompted to send a signal to the electronic diverter 400 to switch to "spray 1" for 30 seconds, then switch to "spray 2" for 30 seconds, and repeat the pattern for five minutes. In such an embodiment, the shower user will get tactile feedback from the sprayer 200 for the length of time they have been in the shower. Perhaps the user has decided to take shorter showers in an effort to save water. By pressing the fifth indicia 665 and actuating the fifth button 655, the user is setting the electronic diverter 400 to repeat a pattern for a length of five minutes. Once the user feels the spray pattern is not changing, the user will know how long the shower has lasted and may make an informed decision on whether or not to exit the shower environment 100 and save water.

Figure 8:
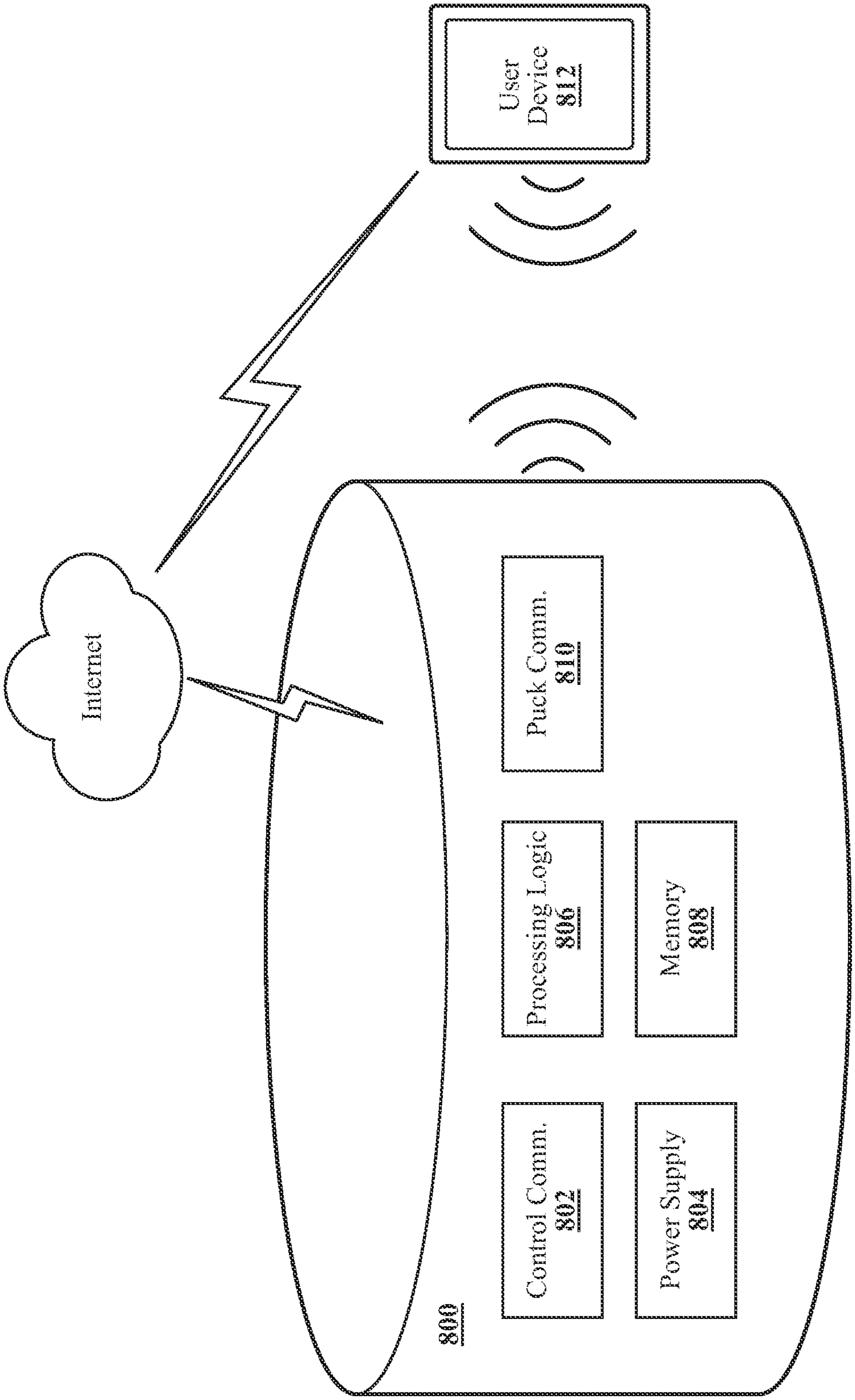
FIG. 8 is a diagram of another spray controller which can be used in the shower environment of FIG. 1, according to an exemplary embodiment.

Referring to FIG. 8, another embodiment of the spray controller is shown as a spray controller 800. The spray controller 800 includes a control communication 802, a power supply 804, a processing logic 806, and a memory 808. The spray controller is similar to the spray controller 500. A difference between the spray controller 800 and the spray controller 500 is that the spray controller 800 includes a wireless communication device, shown as a puck communication 810. The puck communication 810 may receive operating instructions (e.g., instructions to change the spray pattern of the sprayer 200, etc.) from a separate computing entity capable of transmitting and receiving wireless signals (e.g., wireless communication signals, wired communication signals, etc.). These signals may include Bluetooth signals, radio frequency (RF) signals, near field communication (NFC) signals, Wi-Fi signals, and similar signal transmission types. The separate computing entity may be a computer, a personal computing device, a cell phone, a laptop, or similar computing device, shown as a user device 812. In some embodiments, the spray controller 800 may directly communicate with the internet. The user device 812 may include a screen able to render a user interface. A user may interact with the user device 812, sending instructions to the spray controller 800 via a wireless communication connection between the user device 812 and the spray controller 800. The instructions may be received by the puck communication 810, converted to a wireless signal by the processing logic 806, and transmitted by the control puck 900 (e.g., spray controller 800) via the control communication 802 to the electronic diverter 400.

Figure 9:
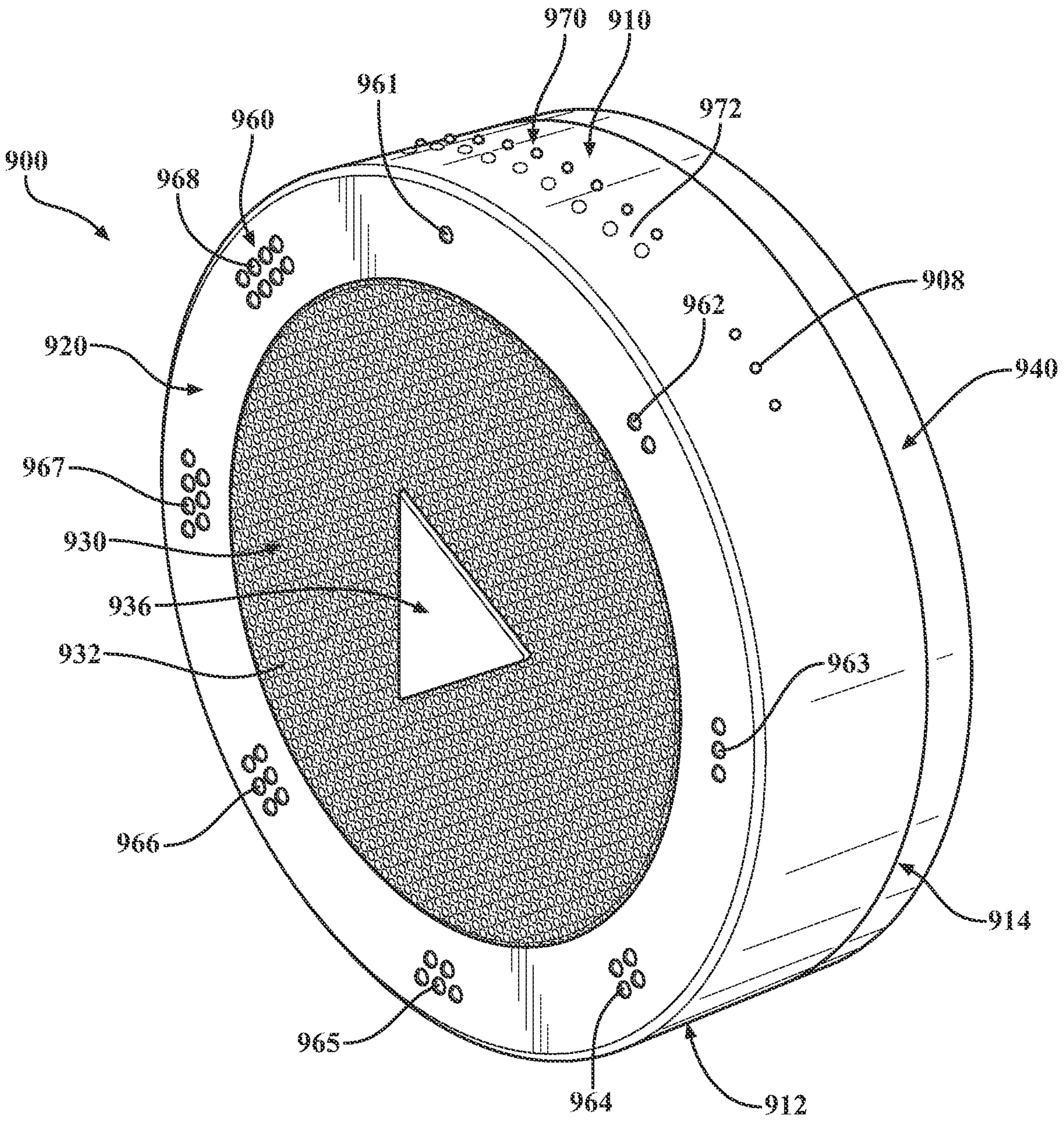
FIG. 9 is a perspective view of another control puck which may function as the spray controller of FIG. 8, according to an exemplary embodiment.

Referring to FIG. 9, another embodiment of the control puck 112 is shown as a control puck 900. The control puck 900 is similar to the control puck 600. A difference between the control puck 900 and the control puck 600 is that the control puck 900 includes the spray controller 800.

Another difference between the control puck 600 and the control puck 900 is that the control puck 900 may further include an indicator 908 configured to light up to show a status of the puck communication 810. For example, the indicator 908 may blink slowly (e.g., on for one second, off for one second, and repeat) when the puck communication 810 is not in communication with a user device (e.g., the user device 812). In some embodiments, the indicator 908 may include a blinking red light to indicate that the control puck 900 is not in wireless communication with another device. The indicator 908 may blink quickly (e.g., on for 0.3 second, off for 0.3 seconds, and repeat) when the puck communication 810 is ready to communicate (e.g., ready to pair) with the user device 812. The indicator 908 may remain on when the puck communication 810 is in communication (e.g., wireless communication, uninterrupted communication, etc.) with the user device 812. In some embodiments, any of the indicator patterns described above may correspond to any of the puck communication 810 statuses described above.

Still referring to FIG. 9, the control puck 900 includes a puck housing 910, an interface ring 920, a speaker grill 930, and a mounting body 940. The puck housing 910 defines a generally annular body. In some embodiments, the puck housing 910 defines a different shape, such as a square, a hexagon, an octagon, and similar shapes. The puck housing 910 may be manufactured from plastic, metal, wood, an elastomer, or similar material. In some embodiments, the puck housing 910 may be manufactured from a non-corrosive material that can withstand the wet environment of a shower environment (e.g., water, soap, etc.). The puck housing 910 includes a first housing end 912 and a second housing end 914 opposite the first housing end 912. The interface ring 920 is coupled to the puck housing 910 proximate the first housing end 912, forming a watertight seal between the puck housing 910 and the interface ring 920. Disposed within the puck housing 910 may be the spray controller 800. In some embodiments, the watertight seal between the puck housing 910 and the interface ring 920 prevents water from corroding and shorting out the spray controller 800 housed within the control puck 900.

The speaker grill 930 may be positioned at a center of the interface ring 920. The speaker grill 930 may be formed of a mesh that allows sound to pass through while simultaneously protecting the internal components of the control puck 900. The speaker grill 930 may be formed of wire mesh, plastic mesh, fabric mesh, a composite fabric mesh reinforced with resin, or similar materials. In some embodiments, the speaker grill 930 is configured to allow a flow of water to pass through the speaker grill 930 and within the puck housing 910. In some embodiments, the speaker grill 930 is coupled to the puck housing 910 proximate the first housing end 912 via adhesive or fasteners. The interface ring 920 may be stretched over the puck housing 910 and the speaker grill 930, behaving similarly to an end cap. The speaker grill 930 may include a decorative front surface 932, including aesthetically pleasing patterns. In some embodiments, the speaker grill 930 is formed of metal, the front surface 932 having a reflective surface finish. In some embodiments, the front surface 932 may be brushed nickel, hammered copper, stainless steel, sandblasted aluminum, or similar finishes. In some embodiments, the speaker grill 930 is chromed plastic.

The interface ring 920 is structured to be interactive, such as by a user of the shower environment 100. The interface ring 920 may be formed by an elastomer exhibiting an inherent compliance when pressed. In some embodiments, the interface ring 920 extends over the puck housing 910 such that the puck housing 910 is hidden from view when the puck housing is coupled to the mounting body 940. This may be preferable in some embodiments as the interface ring 920, formed of an elastomer, may improve the grip a user has on the control puck 900. In other embodiments, the interface ring 920 serves as a bumper to protect the control puck 900 from scratches, nicks, and bumps during handling by a user to, say, replace the batteries or clean.

The mounting body 940 is configured to be coupled to a wall or other vertical or near-vertical surface. For example, the mounting body 940 may be coupled to a wall in the shower environment 100. The mounting body 940 is configured to be removably coupled to the puck housing 910 proximate the second housing end 914. The puck housing 910 may removably couple to the mounting body 940 using latches, snaps, bayonet latches, magnets, or similar latching systems. The puck housing 910 may be coupled to the mounting body 940 such that a quarter-turn of the puck housing 910 releases the puck housing 910 from the mounting body 940.

It may be desirable in some embodiments that the mounting body 940 be coupled to a wall in a shower environment by fasteners, adhesive, double-sided tape, and similar mounting and coupling systems. However, the puck housing 910 may be removably coupled to the mounting body 940 such that the puck housing 910 may be easily removed from the shower environment 100 by a user. For example, the control puck 900 may include disposable batteries for the power supply 804. To replace the batteries, the puck housing 910 may be removed from the mounting body 940, and thus removed from the shower environment 100. In some embodiments the mounting body 940 and the puck housing 910 form a watertight seal where the mounting body 940 and the puck housing 910 interface. This may be desirable in some embodiments to prevent water, soap, and other foreign bodies from corroding the power supply 804.

Each of the puck housing 910, the interface ring 920, and the mounting body 940 define a diameter, shown as a puck diameter 945. The puck diameter 945 may be 3.5-5.5 inches, inclusive. In some embodiments, the puck diameter 945 is 4-5 inches, inclusive. In some embodiments, the puck diameter 945 is 4.5 inches. When coupled together, an outer surface of each of the puck housing 910, the interface ring 920, and the mounting body 940 are contiguous to provide an aesthetically pleasing smooth outer surface. In some embodiments, it may be desirable to add a ribbing to the puck housing 910 to provide a grip (e.g., a surface having a higher coefficient of friction than a smooth surface) for a user if the puck housing 910 is wet.

Figure 10:
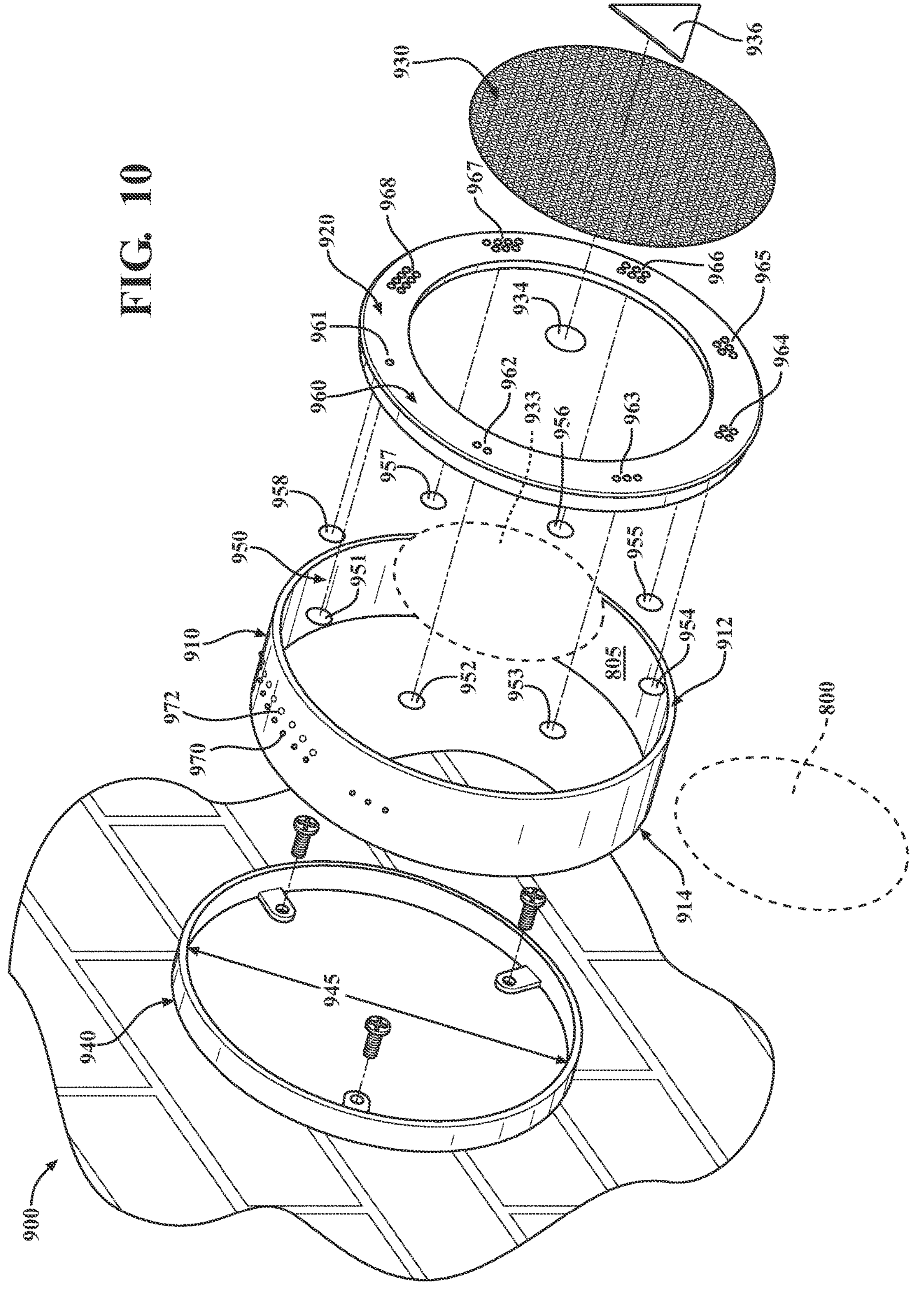
FIG. 10 is an exploded view of the control puck of FIG. 8, according to an exemplary embodiment.

Turning now to FIG. 10, an exploded view of the control puck 900 is shown. Positioned between the puck housing 910 and the interface ring 920 may be a plurality of buttons 950. When the puck housing 910 is coupled to the interface ring 920, the plurality of buttons 950 may be positioned between the puck housing 910 and the interface ring 920 such that a force applied to the interface ring 920 in a direction generally toward the mounting body 940 may actuate one of the plurality of buttons 950.

Speaking more specifically, the plurality of buttons 950 includes a first button 951, a second button 952, a third button 953, a fourth button 954, a fifth button 955, a sixth button 956, a seventh button 957, and an eighth button 958. Each of the plurality of buttons 950 is operatively coupled to the processing logic 806 of the spray controller 800 such that actuation of any of the plurality of buttons 950 sends a signal to the processing logic 806, prompting the processing logic 806 to complete a series of steps.

The interface ring 920 may further include a plurality of indicia 960. The indicia 960 correspond to the plurality of buttons 950 positioned behind the interface ring 920 (e.g., between the interface ring 920 and the puck housing 910). More specifically, the interface ring 920 may include a first indicia 961 corresponding to the first button 951, a second indicia 962 corresponding to the second button 952, a third indicia 963 corresponding to the third button 953, a fourth indicia 964 corresponding to the fourth button 954, a fifth indicia 965 corresponding to the fifth button 955, a sixth indicia 966 corresponding to a sixth button 956, a seventh indicia 967 corresponding to the seventh button 957, and an eighth indicia 968 corresponding to an eighth button 958. For example, a force applied to the third indicia 963 in a direction generally toward the puck housing 910 will actuate the third button 953 positioned behind the interface ring 920.

In some embodiments, the indicia 960 are raised bumps, integrally formed with the interface ring 920. It may be desirable in some embodiments that the indicia 960 be physically distinguishable from each other such that a user with their eyes closed in the shower environment 100 may be able to feel the difference between the indicia 960 (e.g., may be able to feel the different between the first indicia 961 and the fourth indicia 964) such that the user is able to actuate the button that they wish to actuate without having to open their eyes. In some embodiments, the indicia 960 are removably coupled to the interface ring 920 such that the indicia 960 may be removed and replaced with a new indicia (e.g., the first indicia 961 may be removed and replaced with a new (e.g., ninth) indicia). The indicia 960 may be customizable by the user. In some embodiments, the indicia 960 are raised symbols corresponding to the spray pattern that is effected by actuation of the corresponding button. For example, actuation of the first button 951 may signal to the electronic diverter 400 to change the spay pattern to "mist." The first indicia 961 may be a raised, speckled pattern that corresponds to "mist."

Another difference between the control puck 600 and the control puck 900 is that the control puck 900 includes a sound-making device, shown as a speaker 933. The speaker 933 may be positioned within the puck housing 910 and behind the speaker grill 930. The speaker grill 930 is configured to protect a diaphragm of the speaker 933. In some embodiments, the speaker 933 is weatherproof (e.g., able to withstand outdoor conditions, but not designed to be submerged in water). The speaker 933 may be controlled by and operatively coupled to the processing logic 806. The speaker 933 may be configured to play sound, such as podcasts, music, television sound, radio, and so on. In some embodiments, sound files are stored in the memory 808, received by the processing logic 806, and played by the speaker 933. In some embodiments, the manufacturer of the control puck 900 may include pre-stored sound files on the memory 808. In some embodiments, the user device 812 may wirelessly send a sound file wireless to the puck communication 810 to be played by the speaker 933. In some embodiments, speaker 933 behaves like a Bluetooth speaker, available for sale at most brick-and-mortar stores.

Positioned proximate the speaker grill 930 is a speaker button 934. The speaker button 934 may be positioned on the speaker grill 930, in the same plane as the speaker grill 930, or behind the speaker grill 930 and in front of the speaker 933 (e.g., between the speaker grill 930 and the speaker 933). The speaker button 934 may be operably coupled to the processing logic 806 such that actuating the speaker button 934 may control the operation of the speaker 933. Positioned one the outward facing surface of the speaker grill 930 is the speaker interface 936. The speaker interface 936 is similar to the interface ring 920. The speaker interface 936 is operably coupled to the speaker button 934 such that a force applied to the speaker interface 936 in a direction generally toward the mounting body 940 will actuate the speaker button 934. The speaker interface 936 may exhibit an inherent compliance such that when a force is applied to the speaker interface 936 in a direction generally toward the mounting body 940, the speaker interface 936 will flex (e.g., stretch, bias, etc.) and the speaker button 934 is actuated. The speaker interface 936 may cover the speaker button 934, effectively waterproofing the speaker button 934. In some embodiments, the speaker button 934 may be positioned behind the speaker grill 930 and the speaker interface 936 extends through and behind the speaker grill 930, providing a watertight seal about the speaker button 934. While FIG. 9 shows the speaker interface 936 having a shape similar to that of a play button (e.g., an equilateral triangle on its side), the speaker interface 936 may be of many polygon shapes, including a star, a block letter 'K', a square, and so on.

The control puck 900 may further include a volume control 970. The volume control 970 may be positioned on an exterior surface of the puck housing 910. In some embodiments, the volume control 970 may include a volume wheel that a user may turn to control the volume. In some embodiments, the volume control 970 may be a series of capacitive touch sensors that a user may interact with by running a finger or a hand across. The volume control 970 may be operatively coupled to the processing logic 806 (e.g., the speaker 933) to control the volume at which a sound file is played through the speaker 933. The volume control 970 may include a capacitive interface positioned on the puck housing 910. A user may swipe on the volume control 970 to control the volume. For example, a user may swipe clockwise (relative to the control puck 900) on the volume control 970 increase the volume of the speaker 933 and counterclockwise on the volume control 970 to decrease the volume. In some embodiments, the volume control 970 may send a signal to the user device 812 via the puck communication 810 to lower the volume of the user device 812. In some embodiments, the volume control 970 controls the local volume of the speaker 933 without sending a signal to the user device 812.

The control puck 900 may further include a volume indicator 972. Interaction with the volume control 970 by a user may change the volume indicator 972. In some embodiments, the volume indicator 972 is a series of lights (e.g., ten small lights in a row, a light bar, etc.) that changes as the volume is raised and lowered. For example, if the volume is increased by a user using the volume control 970, the volume indicator 972 may get brighter, such as by increasing an amount of lights powered on, or by increasing the intensity of the lights that are already on. In some embodiments, the user device 812 includes a device volume control. When the device volume control is operated by a user, the user device 812 may send a signal to the processing logic 806 to lower the volume of the speaker 933, which may also change the volume indicator 972 such as by decreasing an amount of lights power on, or by decreasing the intensity of the lights that were already on before the device volume control was operated.

The processing logic 806 is configured to provide instructions for four spray patterns, referred to herein as "spray 1", "spray 2", "spray 3", and "spray 4". When the first indicia 961 is pressed and the first button 951 is actuated, the processing logic 806 is prompted to send a signal to the electronic diverter 400 to switch the spray pattern to "spray 1." Likewise, when the second indicia 962 is pressed and the second button 952 is actuated, the processing logic 806 is prompted to send a signal to the electronic diverter 400 to switch the spray pattern to "spray 2." When the third indicia 963 is pressed and the third button 953 is actuated, the electronic diverter 400 switches to "spray 3", and when the fourth indicia 964 is pressed and the fourth button 954 is actuated, the electronic diverter 400 switches to "spray 4". The first button 951, the second button 952, the third button 953, and the fourth button 954 may be collectively referred to as mode buttons 1234. When any one of the mode buttons 1234 is actuated, the processing logic 806 sends a signal to the electronic diverter 400 to change the spray pattern for an indefinite length of time. In some embodiments, the electronic diverter 400, even if powered off and then on again, will not change the spray pattern until a signal is sent by the processing logic 806 to change the spray pattern. In some embodiments, the electronic diverter 400 restarts each time the electronic diverter 400 is powered off, changing to "spray 1" (or some other default reset spray pattern) when starting up again. The mode buttons 1234 may be set during manufacturing and unable to be changed by the user of the shower environment.

The fifth button 955, the sixth button 956, the seventh button 957, and the eighth button 958 may be collectively referred to as program buttons 5678. In some embodiments, the program buttons 5678 behave similarly to the mode buttons 1234 and are not able to be changed by the user. In some embodiments, the program buttons 5678 are preset by the manufacturer such that when actuated, the processing logic 806 sends a signal to the electronic diverter 400 to change the spray pattern, the electronic diverter 400 following a series of instructions over a given amount of time. For example, if the fifth indicia 965 is pressed and the fifth button 955 is actuated by a user, the processing logic 806 may be prompted to send a signal to the electronic diverter 400 to switch to "spray 1" for 30 seconds, then switch to "spray 2" for 30 seconds, and repeat the pattern for five minutes. In such an embodiment, the shower user will get tactile feedback from the sprayer 200 for the length of time they have been in the shower. Perhaps the user has decided to take shorter showers in an effort to save water. By pressing the fifth indicia 965 and actuating the fifth button 955, the user is setting the electronic diverter 400 to repeat a pattern for a length of five minutes. Once the user feels the spray pattern is not changing, the user will know how long the shower has lasted and may make an informed decision on whether or not to exit the shower environment 100 and save water.

In some embodiments, the electronic diverter 400 is able to switch between spray patterns quickly, simulating a pulsing shower. For example, actuation of the sixth button 956 may prompt the processing logic 806 to send a signal to the electronic diverter to change between "spray 2" and "spray 3" every second for a predetermined length of time.

The user may change or program the program buttons 5678 using the user device 812. The user may download, on the user device 812, a software application that allows the user to interact with and personalize the shower system to fit their needs. For example, the fifth button 955, when actuated, may prompt the electronic diverter 400 to repeat a spray pattern of: "spray 3" for ten seconds, "spray 2" for ten seconds, and repeat. The user may reprogram the processing logic 806 such that actuation of the fifth button 955 prompts the electronic diverter 400 to repeat a spray pattern different from the one just previous, such as "spray 1" for 15 seconds, "spray 4" for 20 seconds, "spray 2" for five seconds, and repeat.

Figure 11:
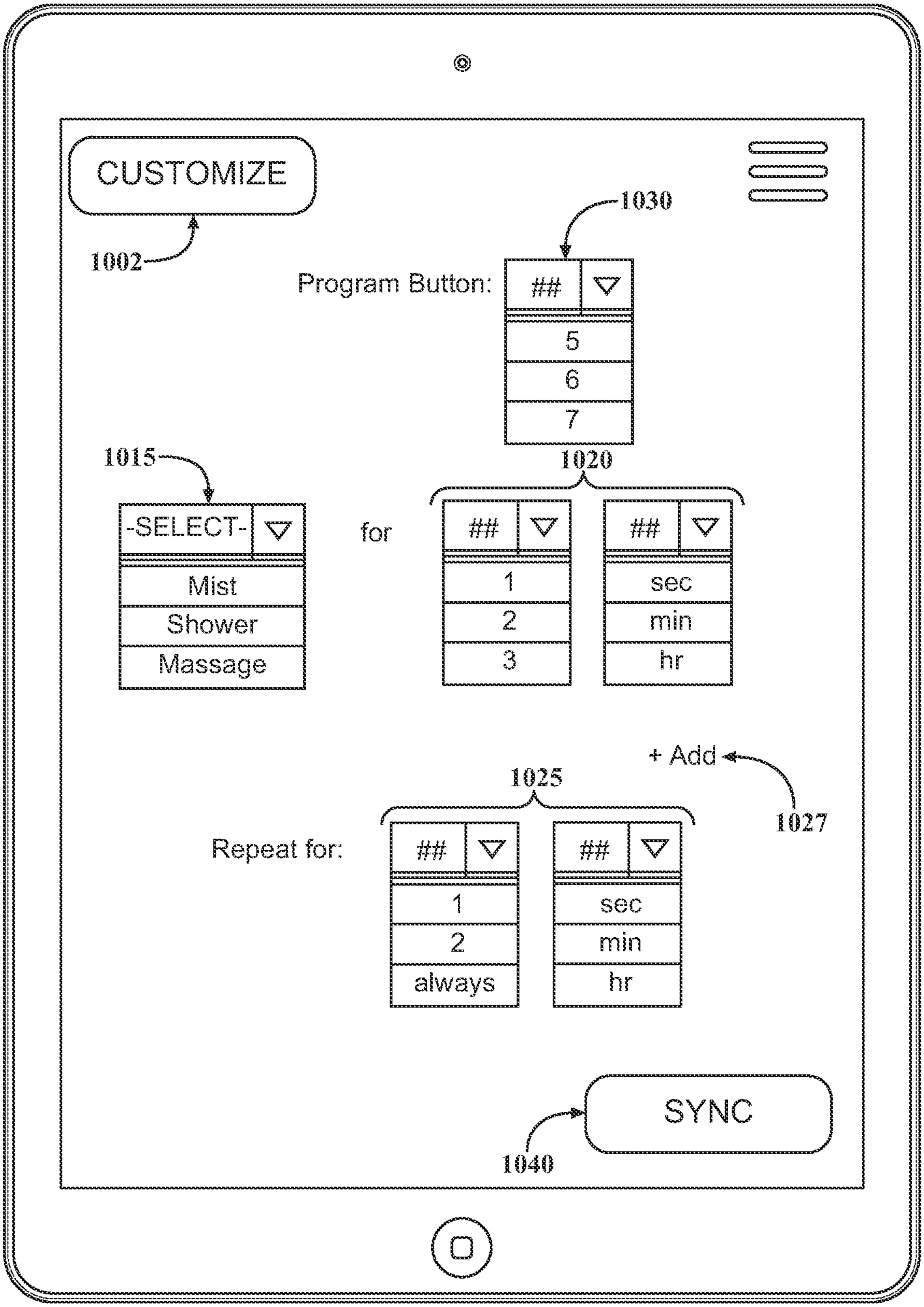
FIG. 11 is an illustration of a user interface which can be used to control the shower environment of FIG. 1, according to an exemplary embodiment.

Referring to FIG. 11, the user device 812 may render, on the screen, a "customize" control 1002. The user may select the customize control 1002, opening the customize window 1010. Within the customize window 1010, the user may select a spray pattern 1015, a spray duration 1020, a repeat length 1025, and a program button selection 1030. Each election may be made using a drop-down menu. For example, the user may decide that they would like "mist" for three minutes, "shower" for one minute, and they would like the pattern to repeat "always" (e.g., until a new button (e.g., mode button 1234, program button 5678) is selected regardless of whether or not the electronic diverter 400 powers off). Should the user desire to add another spray pattern to the customized program, the user may select an add pattern selection 1027. Selection of the add pattern selection 1027 may render on the customize window 1010 a duplication of the spray pattern 1015 and the spray duration 1020 such that the user may add on to the program. The user may then interface with the program button selection 1030. As shown, the user may decide to choose the fifth button 955, the sixth button 956, or the seventh button 957. The user may select one of the options in the drop-down menu such that the steps shown in FIG. 11 will be executed when the button selected in the program button selection 1030 is actuated by a user within the shower environment 100. Lastly, the user may select the "SYNC" button 1040 near the bottom of the screen to send the instructions to the processing logic 806. While FIG. 11 shows that only the fifth button 955, the sixth button 956, and the seventh button 957 may be programmed by the user using the user device 812, it should be understood that in some embodiments, the user may use the user device 812 to program any of the plurality of buttons 950. In some embodiments, none of the buttons (e.g., mode buttons 1234, program buttons 5678) are programmable.

Speaking generally, the spray controller 800 (e.g., the spray controller 500), and more specifically the processing logic 806 (e.g., the processing logic 806), may be configured to analyze a sound file and change the spray pattern exiting the sprayer 200 in response to the sound file. (e.g., change operation of the electronic diverter 400 in response to a property of the sound file). For example, a sound file may be a song that changes volume (e.g., decibels, wave amplitude, etc.) during the duration of the song. The processing logic 806 may send a signal to the electronic diverter 400 to set the spray pattern to "spray 1" when the sound file outputs sound in a decibel range of 0-50 dB, "spray 2" for 50-60 dB, "spray 3" for 60-70 db, and "spray 4" for 70-80 db. These ranges are meant as an example and not meant to be limiting. The user may interact with the user interface of the user device 812 to adjust the spray pattern exiting the sprayer 200 and the threshold ranges the electronic diverter 400 responds to.

Figure 12:
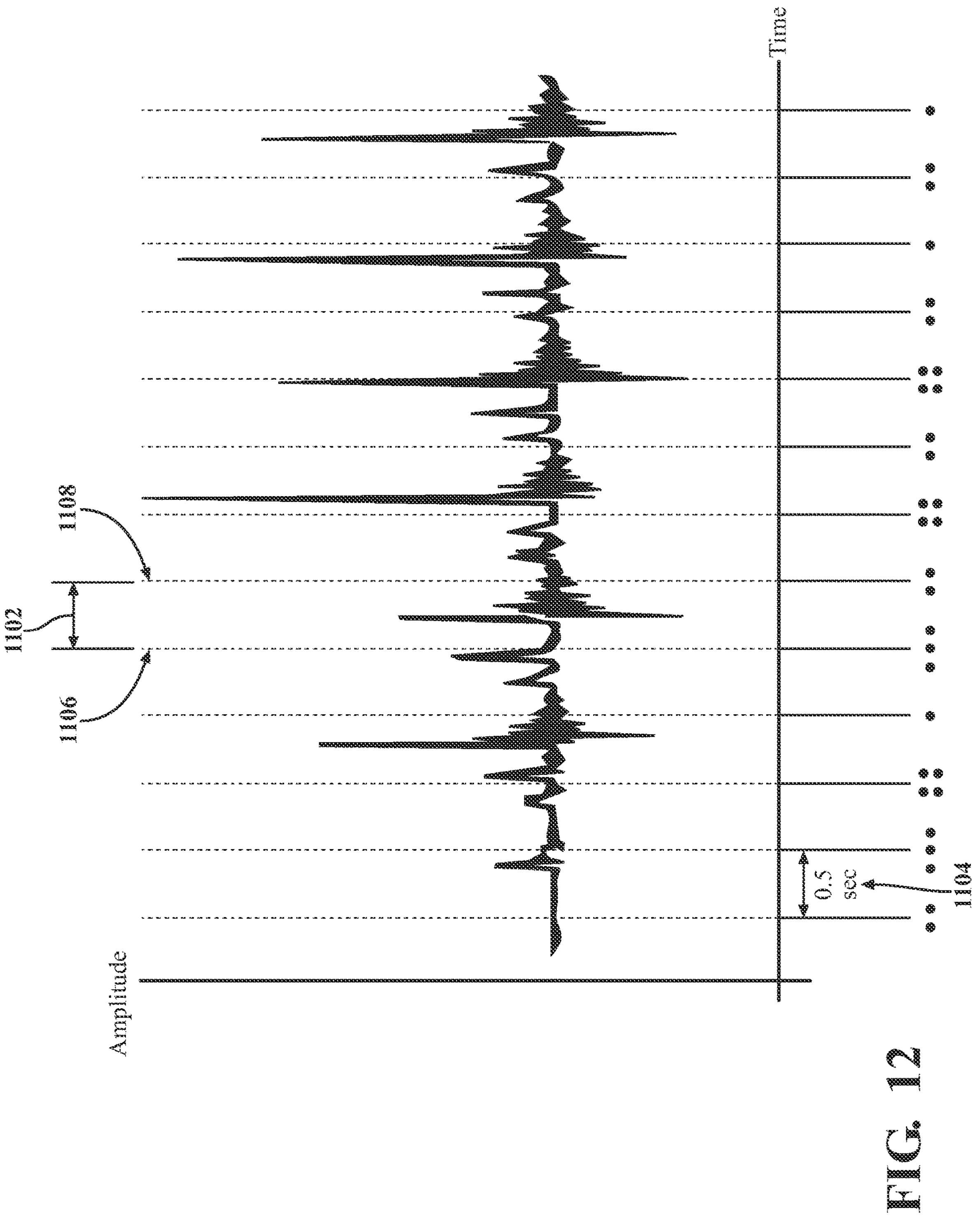
FIG. 12 is a graph of a waveform illustrating sound-based control of the shower environment of FIG. 1, according to an exemplary embodiment.

In some embodiments, the processing logic 806 sends a signal to the electronic diverter 400 to change the spray pattern based on the frequency (e.g., pitch) of the sound file. Turning to FIG. 12, a sample sound file is shown. The processing logic 806 splits the sound file into segments (e.g., a segment 1102). Each segment 1102 is split at constant time intervals to be equal in length, shown as the segment 1102 of time interval 1104 between a first split 1106 and a second split 1108. The time interval 1104 may be as long as the length of the sound file, or may be as short as the Nyquist sampling rate (assuming an upper bound of 20,000 Hz for human hearing, approximately 0.000025 seconds). In some embodiments, the time interval 1104 is between 0 seconds and 30 seconds, inclusive. In some embodiments, the time interval 1104 is between 0.25 and 10 seconds, inclusive. In some embodiments, the time interval 1104 is 0.5 seconds.

The spray controller 800 is configured to change the spray pattern of the electronic diverter 400 based on the segment 1102 and the time interval 1104. In some embodiments, the processing logic 806 takes an average (e.g., arithmetic average, geometric average, etc.) of the frequency of the sound file within the segment 1102 and sends a signal to the electronic diverter 400 to change the spray pattern based on the calculated average frequency. In some embodiments, the processing logic 806 may take a Fast Fourier Transform (FFT) of the segment 1102. By taking an FFT, the processing logic 806 may then select the peak of the FFT as the "modal frequency" of the segment 1102 and change the spray pattern in response to the modal frequency. In some embodiments, the processing logic 806 may select a finite amount of peaks (e.g., 2, 3, 4, etc.) from the FFT and average the frequency of the finite amount of peaks to calculate the average frequency. In some embodiments, the processing logic 806 may follow instructions to split the sound file into segments of 0.5 seconds in length, measure the average frequency of the sound file between splits (e.g., using FFT), match the average frequency to a spray pattern, and send a signal to the electronic diverter 400 to actuate the actuator 402 and the pattern wheel 404 to change the spray pattern. For example, popular vocals (e.g., a male tenor voice) may have an approximate frequency range from $C_3$ to $C_5$, or 130 Hz to 530 Hz. Within the memory 808 of the spray controller 800 may be a chart, matching a range of frequencies with a corresponding spray pattern (e.g., "mist" for frequencies between 100 Hz-1,000 Hz, inclusive; "spray 3" for frequencies between 10,000 Hz and 100,000 Hz, inclusive; etc.). If the sound file includes a section of popular vocals, then the processing logic 806 may measure, between splits, an average frequency of 320 Hz. Then the processing logic 806 can match the average frequency measured to the spray pattern "mist," and send a signal to the electronic diverter 400 to change the spray pattern.

As shown in FIG. 12, the sound file is broken into 0.5 second segments. At each split (e.g., the first split 1106, the second split 1108), the spray pattern changes. Specifically, the frequency of the segment 1102 is averaged between the first split 1106 and the second split 1108, the average frequency is matched to a spray pattern, and the spray pattern is actuated at the end of the segment 1102, or at the second split 1108. In some embodiments, the processing logic 806 is able to look ahead and proactively change the spray pattern. For example, the processing logic 806 may calculate the average frequency of the segment 1102 before the segment 1102 is played through the speaker 933. Thus, the processing logic 806 may signal to the electronic diverter 400 to change the spray pattern in response to the average frequency of the segment 1102 at the first split 1106. This may be possible when the sound file is pre-loaded to the memory 808. In some embodiments, the processing logic 806 may purposefully delay playing the sound file through the speaker 933, such as when the sound file is streamed directly from the internet or from the user device 812, in order to proactively change the spray pattern. This may be advantageous since the user will feel the spray at the same time as the corresponding sound file segment is playing, instead of feeling the spray pattern that corresponded to the sound file segment that just played in the past (e.g., the time interval 1104 ago).

In some embodiments, the processing logic 806 splits the sound file into segments and measures a weighted average frequency within segment, weighted based on corresponding loudness level (e.g., dB). For example, a sound file may include loud, low-frequency sounds (e.g., bass, kick, 808bass, etc.) in a range of 20-50 Hz, and relatively soft (e.g., low volume) high-pitch sounds (e.g., female soprano, violin, etc.) in a range of 600-1000 Hz. If only the frequencies were averaged, the soft, high frequency sounds, given their higher numeric value, would disproportionately outweigh the low bass sounds. To remedy this, the volume level (e.g., decibel level, wave amplitude, loudness, etc.) of the sound file may also be included in the averaging calculation, giving higher weight to the loud bass notes than to the soft high-pitch notes.

In some embodiments, the sound file is not pre-uploaded to the memory 808 of the spray controller 800. For example, the sound file may be sent wirelessly (e.g., cast, streamed, etc.) to the speaker 933 from the user device 812. In such an embodiment, the processing logic 806 may analyze the sound file in real time, averaging the frequency and the loudness as the sound file is played. In some embodiments, the processing logic 806 may, instead of splitting the sound file into segments, continuously change the spray pattern in response to the sound file. For example, a sound file may include a kick drum played on every beat at a speed of 100 bpm (beats per minute). This means that the kick drum is played once every 0.6 seconds. The processing logic 806 may send a signal to the electronic diverter 400 to change the spray pattern to "massage" each time the kick is played, but remain in "shower" otherwise. Thus, instead of averaging the sound file over the time interval, the processing logic 806 responds immediately to the sound file. As will be appreciated, the steps of averaging the sound file, determining a spray pattern, sending a signal to the electronic diverter 400, and actuating the electronic diverter 400 happen so quickly as to feel simultaneous to the user of the shower environment 100 (e.g., not detectable by human senses). To the user of the sprayer 200, they will feel "shower" most of the time, but "massage" will pulse with the beat of the sound file, creating a unique shower experience for the user.

In some embodiments, the control puck 900 may connect directly to the internet and may be configured to stream music, podcasts, audio books, and the like directly from the internet via streaming services (e.g., Spotify, Audible, iTunes, Apple Music, Soundcloud, Prime Music, etc.) In some embodiments, the control puck 900 is configured to be paired with a voice-activated assistant device, such as Google Home devices, Amazon Echo devices, Apple HomePod devices, and similar devices (e.g., Google assistant, Siri, etc.). In some embodiments, the control puck 900 is a voice-controlled assistant device, including a microphone and configured to respond to voice commands from a user.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

All structural, electrical, and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

What is claimed is:

1. A shower system for controlling a spray pattern of water, the shower system comprising:

a sprayer comprising:

a housing comprising a water inlet and a plurality of water outlets configured to discharge water from the housing to form a plurality of different spray patterns; and an electronic diverter located within the housing and configured to automatically divert the water to different sets of the plurality of water outlets to form the plurality of different spray patterns responsive to an instruction signal, wherein the electronic diverter is configured to transition between the plurality of different spray patterns within a rotation interval less than an amount of time required for the water discharged from the housing to form a spray pattern of the plurality of different spray patterns; and a control device separate from the sprayer and configured to provide the instruction signal to the electronic diverter to cause the electronic diverter to change between the plurality of different spray patterns.

2. The shower system of claim 1, wherein the electronic diverter comprises a pattern wheel configured to rotate between a plurality of different positions to form the plurality of different spray patterns.

3. The shower system of claim 2, wherein the plurality of different positions comprise:

a first position in which the pattern wheel causes the water discharged from the housing to form a first spray pattern of the plurality of different spray patterns;

a second position in which the pattern wheel causes the water discharged from the housing to form a second spray pattern of the plurality of different spray patterns; and a third position in which the pattern wheel causes the water discharged from the housing to form a third spray pattern of the plurality of different spray patterns.

4. The shower system of claim 3, wherein:

the second position is located between the first position and the third position such that rotation of the pattern wheel from the first position to the third position causes the pattern wheel to rotate sequentially from the first position to the second position and then from the second position to the third position; and during rotation from the first position to the third position, the electronic diverter is configured to cause the pattern wheel to remain in the second position for less than an amount of time required for the second spray pattern to form such that the water discharged from the housing changes from the first spray pattern to the third spray pattern without forming the second spray pattern.

5. The shower system of claim 2, wherein the electronic diverter comprises an actuator configured to rotate the pattern wheel from a first position of the plurality of different positions to a second position of the plurality of different positions within the rotation interval less than the amount of time required for the water discharged from the housing to form the spray pattern of the plurality of different spray patterns.

6. The shower system of claim 5, wherein the amount of time required for the water discharged from the housing to form the spray pattern is between 0.5 seconds and 0.7 seconds.

7. The shower system of claim 1, wherein the sprayer comprises a power supply contained within the housing and configured to supply power to the electronic diverter, the power supply configured to charge using kinetic energy derived from a flow of water through the sprayer.

8. The shower system of claim 1, wherein the control device comprises a user interface and is configured to generate the instruction signal to cause the electronic diverter to change between the plurality of different spray patterns based on user input provided via the user interface.

9. The shower system of claim 1, wherein the control device is configured to extract audio characteristics from a sound file and generate the instruction signal to cause the electronic diverter to change between the plurality of different spray patterns based on the audio characteristics of the sound file.

10. The shower system of claim 9, wherein the control device is configured to:

split the sound file into a plurality of segments;

calculate an audio frequency of each segment of the sound file;

generate a sequence of spray patterns by matching the audio frequency of each segment of the sound file to a corresponding spray pattern of the plurality of different spray patterns; and generate the instruction signal to cause the electronic diverter to provide the sequence of spray patterns.

11. The shower system of claim 10, wherein calculating the audio frequency of each segment of the sound file comprises performing a Fast Fourier Transform (FFT) of each segment.

12. The shower system of claim 9, wherein the control device is configured to:

split the sound file into a segment having a time interval;

calculate a Fast Fourier Transform (FFT) of the segment;

determine a first peak and a second peak of the FFT, the first peak corresponding to a first frequency and a first amplitude, and the second peak corresponding to a second frequency and a second amplitude;

calculate a weighted average of the first peak and the second peak;

match the weighted average to a corresponding spray pattern of the plurality of different spray patterns; and generate the instruction signal to cause the electronic diverter to provide the corresponding spray pattern.

13. A sprayer for use in a shower environment, the sprayer comprising:

a housing comprising a water inlet and a plurality of water outlets configured to discharge water from the housing to form a plurality of different spray patterns;

an electronic diverter located within the housing and configured to transition the water discharged from the housing between the plurality of different spray patterns responsive to an instruction signal provided by a control device separate from the sprayer, wherein the electronic diverter is configured to transition between the plurality of different spray patterns within a rotation interval less than an amount of time required for the water discharged from the housing to form a spray pattern of the plurality of different spray patterns, the electronic diverter comprising:

a pattern wheel configured to rotate between a plurality of different positions to form the plurality of different spray patterns; and an actuator configured to operate the pattern wheel to rotate between the plurality of different positions.

14. The sprayer of claim 13, wherein the plurality of different positions comprise:

a first position in which the pattern wheel causes the water discharged from the housing to form a first spray pattern of the plurality of different spray patterns;

a second position in which the pattern wheel causes the water discharged from the housing to form a second spray pattern of the plurality of different spray patterns; and a third position in which the pattern wheel causes the water discharged from the housing to form a third spray pattern of the plurality of different spray patterns.

15. The sprayer of claim 14, wherein:

the second position is located between the first position and the third position such that rotation of the pattern wheel from the first position to the third position causes the pattern wheel to rotate sequentially from the first position to the second position and then from the second position to the third position; and during rotation from the first position to the third position, the actuator is configured to cause the pattern wheel to remain in the second position for less than an amount of time required for the second spray pattern to form such that the water discharged from the housing changes from the first spray pattern to the third spray pattern without forming the second spray pattern.

16. The sprayer of claim 13, wherein the actuator is configured to rotate the pattern wheel from a first position of the plurality of different positions to a second position of the plurality of different positions within the rotation interval less than the amount of time required for the water discharged from the housing to form the spray pattern of the plurality of different spray patterns.

17. The sprayer of claim 16, wherein the amount of time required for the water discharged from the housing to form the spray pattern is between approximately 0.5 seconds and approximately 0.7 seconds.

18. The sprayer of claim 13, further comprising a power supply contained within the housing and configured to supply power to the electronic diverter, the power supply configured to charge using kinetic energy derived from a flow of water through the sprayer.

19. A method for controlling a sprayer in a shower system, the method comprising:

generating, at a control device separate from the sprayer, an instruction signal for the sprayer to change between a plurality of different spray patterns;

providing the instruction signal from the control device to an electronic diverter located within a housing of the sprayer, the housing comprising a water inlet and a plurality of water outlets configured to discharge water from the housing;

operating the electronic diverter responsive to the instruction signal to automatically divert the water to different sets of the plurality of water outlets to form the plurality of different spray patterns, wherein operating the electronic diverter comprises transitioning between the plurality of different spray patterns within a rotation interval less than an amount of time required for the water discharged from the housing to form a spray pattern of the plurality of different spray patterns.

20. The method claim 19, wherein operating the electronic diverter responsive to the instruction signal comprises operating a pattern wheel of the electronic diverter to rotate between a plurality of different positions to form the plurality of different spray patterns.

* * * * *